March 29, 1955　　　　L. K. LOEHR　　　　2,705,291
AUTOMATIC STARTING DEVICE FOR INTERNAL COMBUSTION ENGINES
Filed April 17, 1951　　　　　　　　　　　　　6 Sheets-Sheet 4
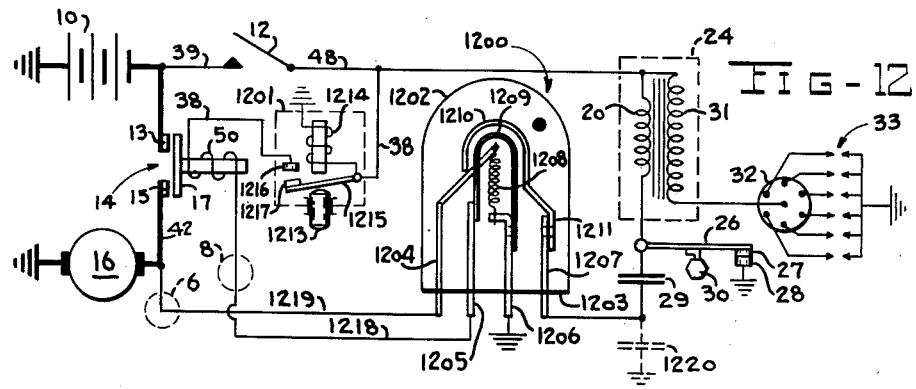
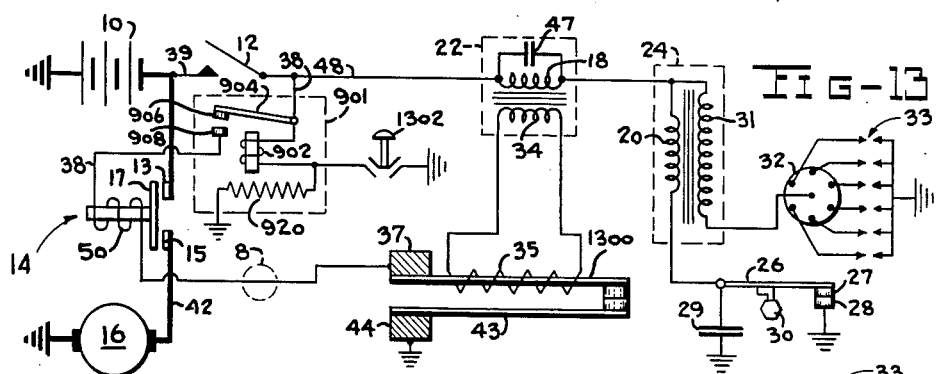
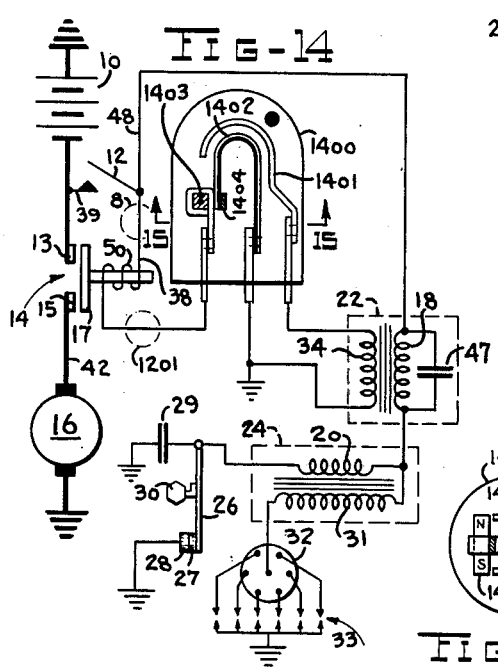
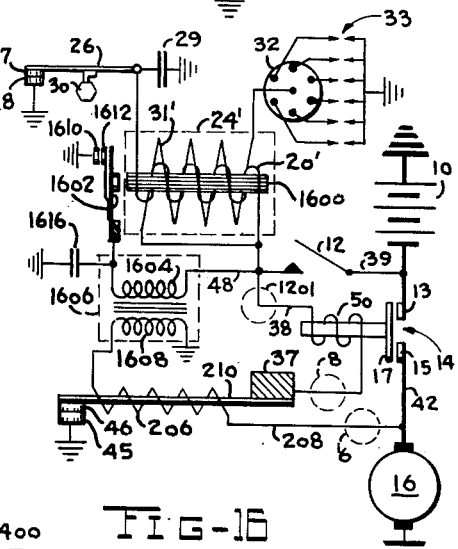
INVENTOR.
Leslie K. Loehr

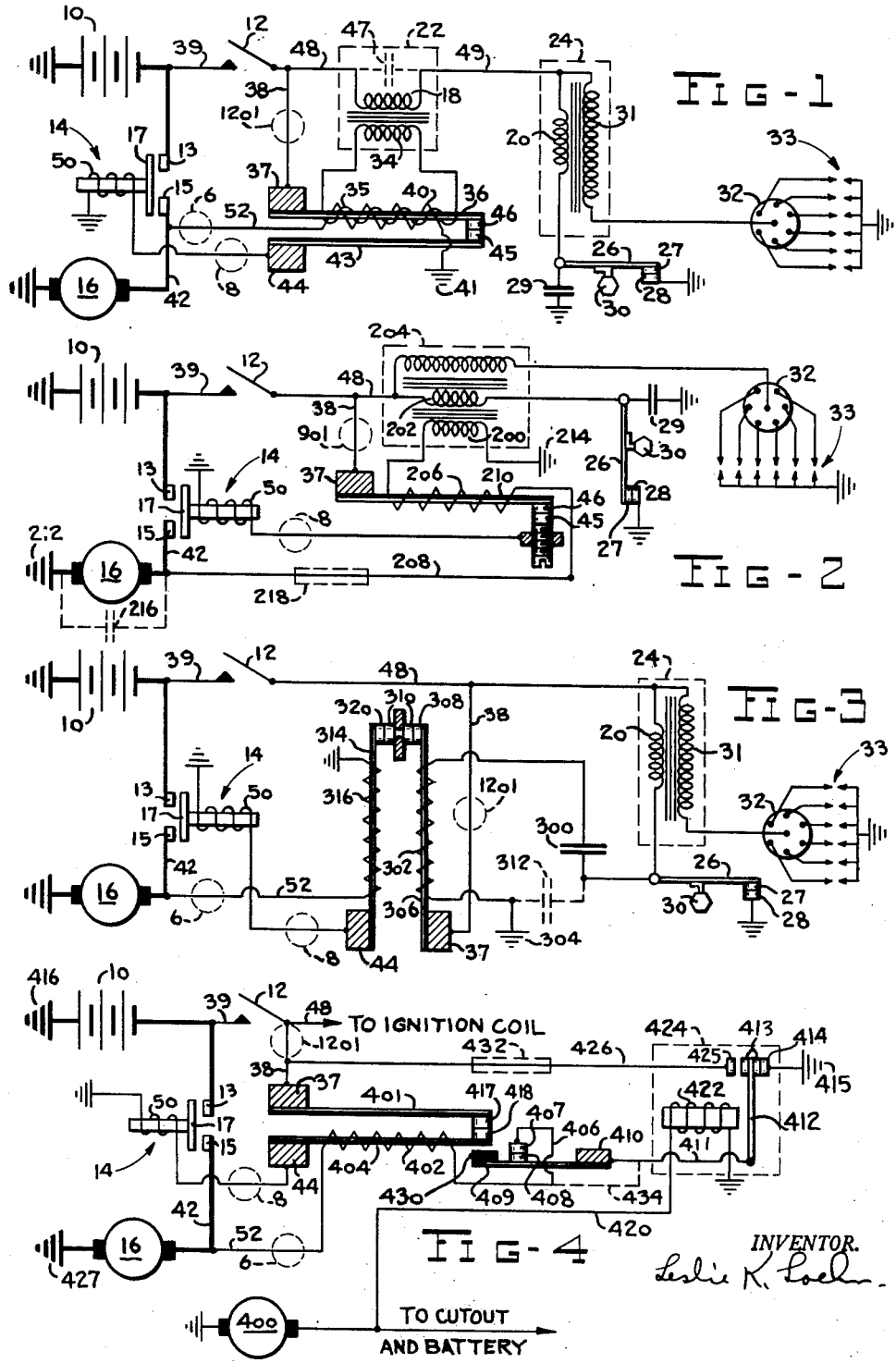
March 29, 1955 L. K. LOEHR 2,705,291
AUTOMATIC STARTING DEVICE FOR INTERNAL COMBUSTION ENGINES
Filed April 17, 1951 6 Sheets-Sheet 1

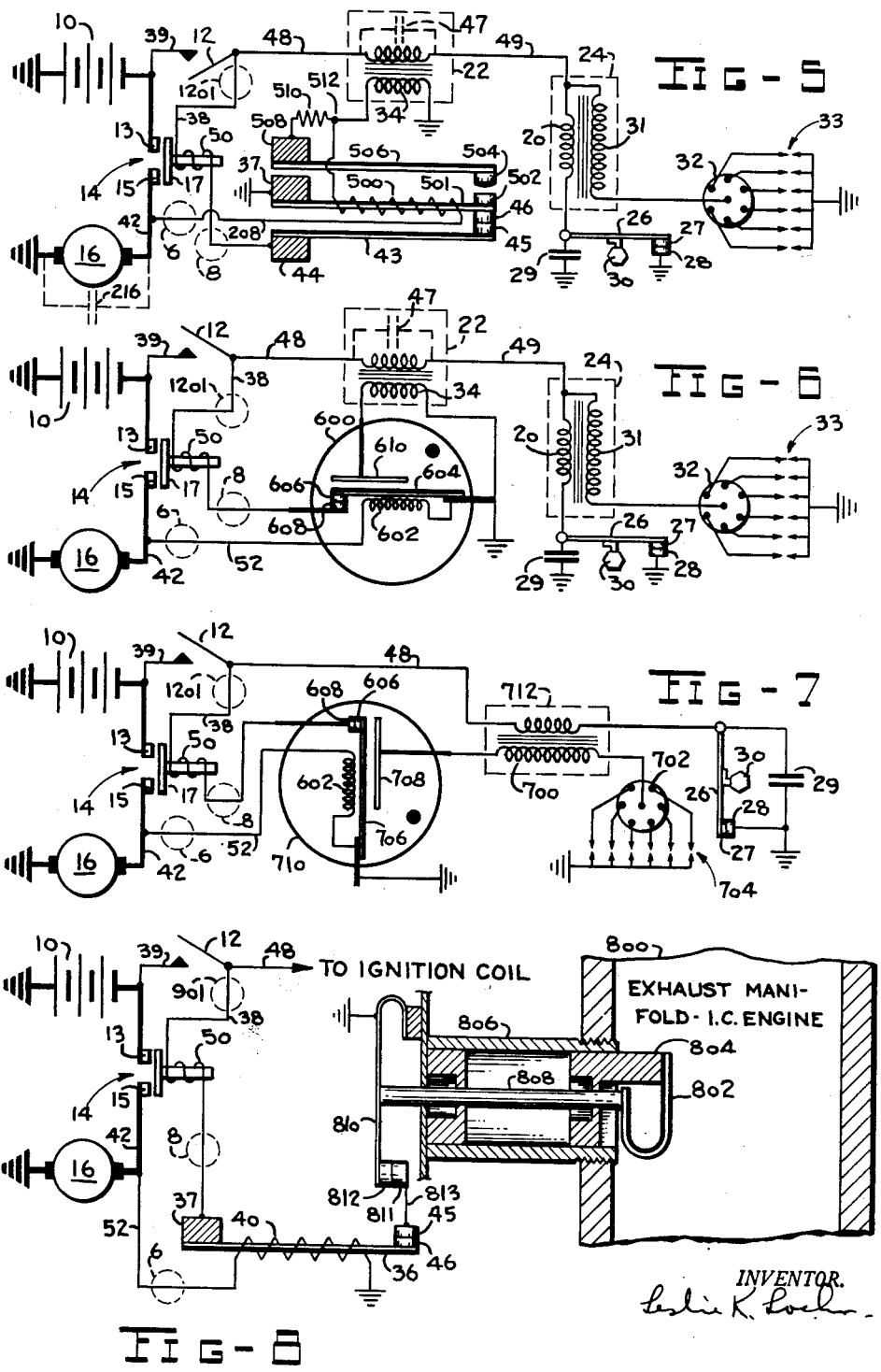

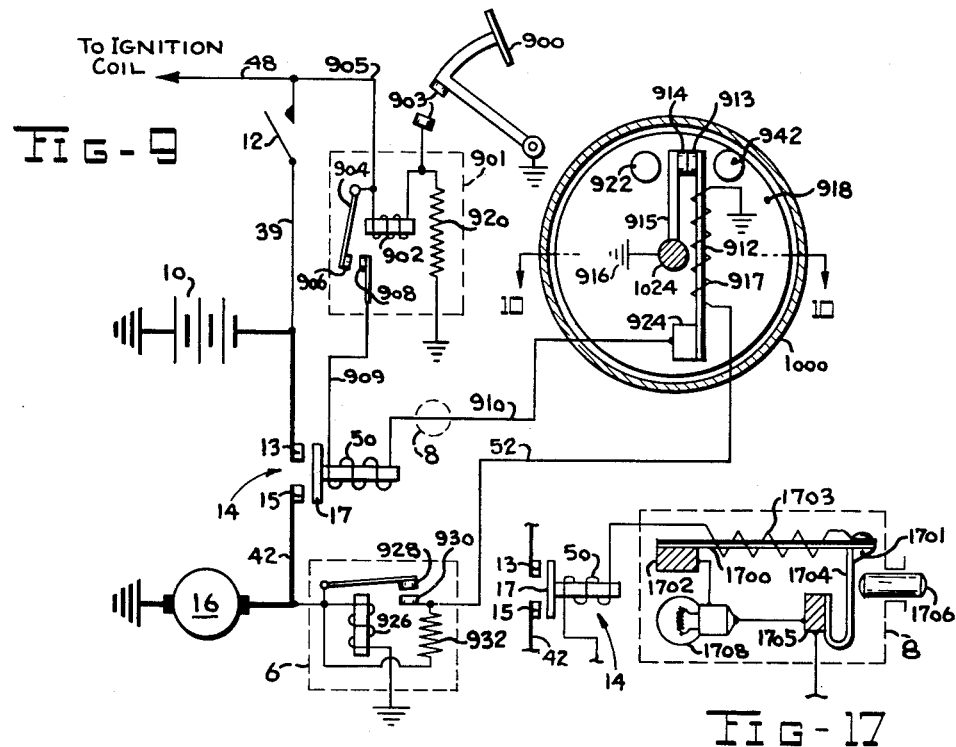
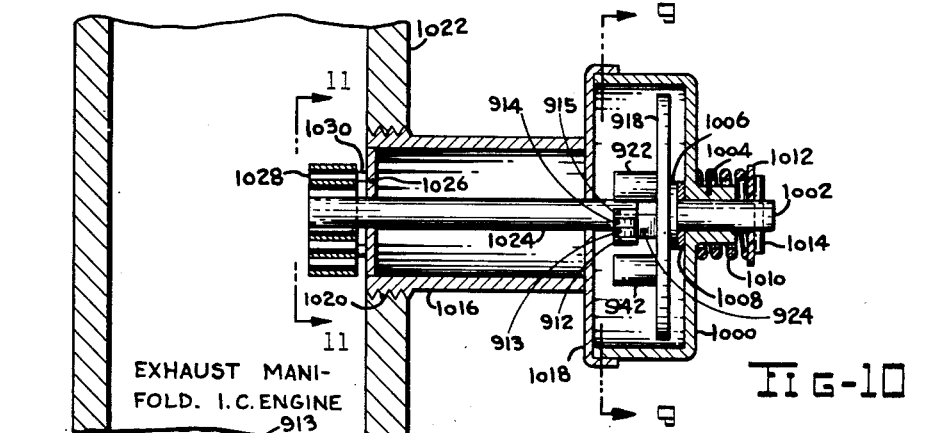
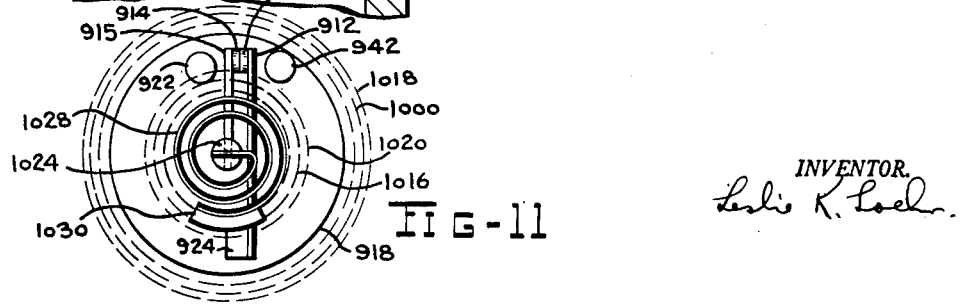

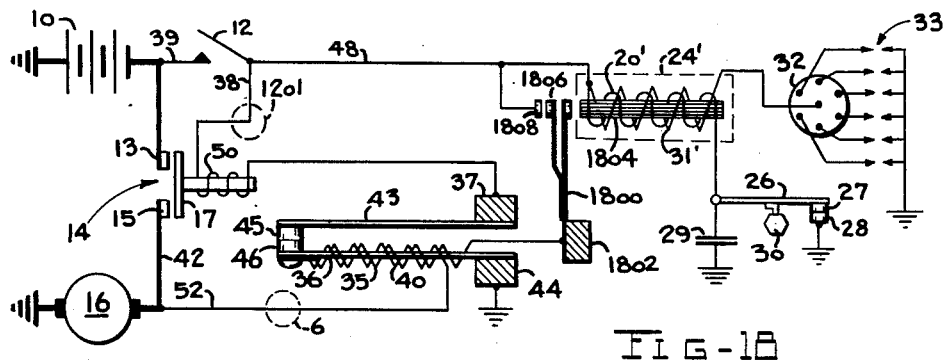

March 29, 1955     L. K. LOEHR     2,705,291
AUTOMATIC STARTING DEVICE FOR INTERNAL COMBUSTION ENGINES
Filed April 17, 1951     6 Sheets-Sheet 6
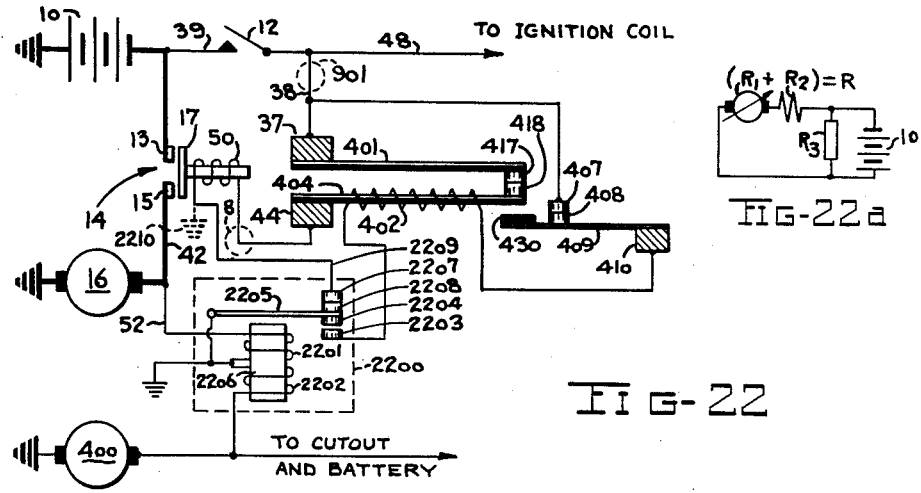
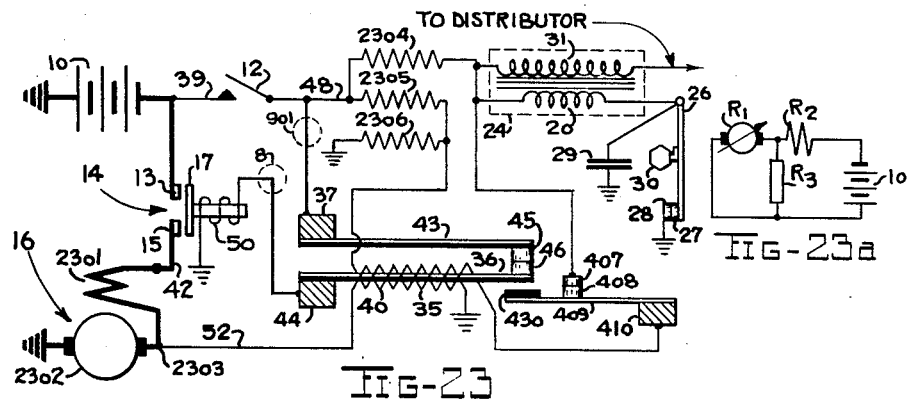
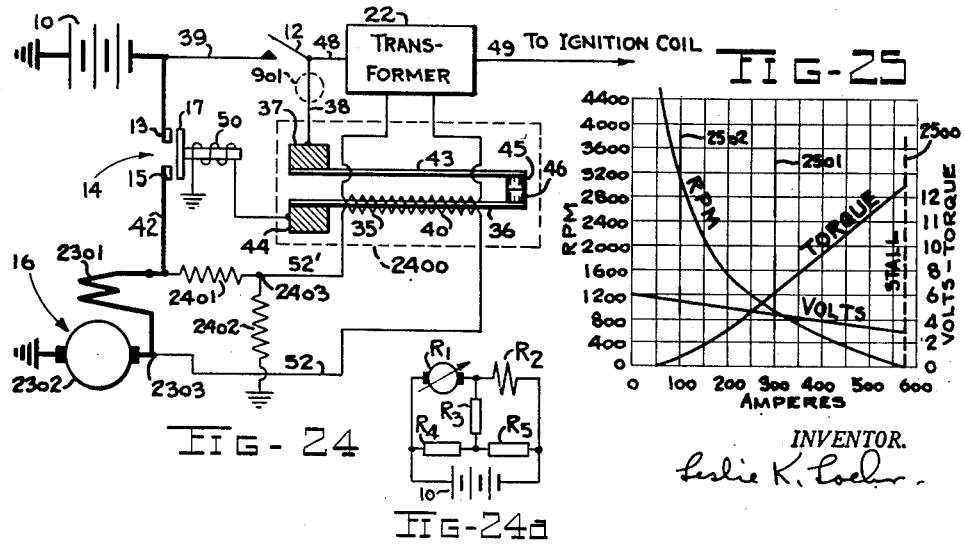
INVENTOR.
Leslie K. Loehr

United States Patent Office 2,705,291
Patented Mar. 29, 1955

2,705,291

AUTOMATIC STARTING DEVICE FOR INTERNAL COMBUSTION ENGINES

Leslie K. Loehr, Los Angeles, Calif.

Application April 17, 1951, Serial No. 221,504

32 Claims. (Cl. 290—37)

This invention relates to improvements in electrical starting systems for engines requiring prerotation in order to begin self-operation, and more particularly to improvements in devices for the automatic starting and restarting of such engines and the means for controlling the exact moment of such operations.

It is well known that internal combustion engines, and particularly those used in automobiles, frequently stall because of improper operation, or faulty ignition, or poor carburetion etc., and the desirability of having some means for automatic and immediate restarting of stalled internal combustion engines has been recognized for many years. Six United States patents, 1,773,913; 1,912,904; 2,004,053; 2,121,974; 2,131,403 and 2,135,620 were issued to the present applicant on inventions wherein failure of an engine to rotate under its own power automatically caused a starting motor to engage and crank the engine. Some of the systems utilized mechanical governors, some utilized voltage from the generator for operating relays, and some utilized manifold pressures which actuated circuit breakers. Some of the systems included time delays operated by a decelerating starting motor and/or a dash pot or vibrating reed. But, the system that was found to be most satisfactory and is in current use to this date is a combination of the ones disclosed in the Patents 1,912,904 and 2,121,974.

A number of United States patents, such as 2,021,396 to W. J. Williams, 2,064,350 to P. H. Maurer, 2,020,750 to D. P. Wertz, etc. were issued; in all of these a multiplicity of relays are used in one way or another for accomplishing the sought result in an effort to improve on the above named patents issued to the present applicant. Since the use of automatic restarting devices does not constitute an absolute necessity for operating internal combustion engines, the cost of such devices becomes a deciding factor, and, although they may perform their function very well, if their cost is high, their incorporation into starting systems is prevented on a cost basis alone, although it is fully recognized that such automatic devices increase the factor of safety by eliminating unexpected, sudden loss of power in the midst of rapidly moving traffic, etc. due to stalled engines.

The disclosed systems represent an ultimate in electrical simplicity, function and costs, and, therefore they provide automatic devices for engine starting systems which make their use possible on a wide scale because of much improved performance, and because the objection to cost can no longer prevail.

Recently, the necessity for automatic restarting systems has been accentuated to a great extent by the incorporation of overdrives, fluid clutches, and automatic transmission systems as standard and optional equipment in present day automobiles. Many of these arrangements prevent the driving wheels from rotating the engine, particularly at low speeds, therefore, restarting a stalled engine by using the momentum of the vehicle is not possible when equipment of this type is included in the driving system of the automobile.

The electrical system of internal combustion engines normally includes a storage battery; a starting motor including suitable means for engaging and rotating the engine; a magnetic starting switch; an ignition system which includes an ignition switch, an ignition coil, a distributor having breaker points and a condenser in a circuit with the primary winding of said coil, and spark plugs in circuit with the distributor and the secondary winding of said ignition coil. Energizing the magnetic starting switch connects the battery to the starting motor which engages and rotates the engine. Under load, the starting motor resistance is very low with the result that high current is drawn from the battery, causing the battery voltage to drop because of its internal resistance to approximately two thirds of its normal open circuit voltage. However, when the engine starts and the starting motor spins freely without load, the apparent resistance of the motor increases because of higher counter electromotive force developed in the motor, causing the current to decrease, and permitting the battery voltage to return to a value almost equal to its normal open circuit voltage. Therefore, it follows very simply that any circuit drawing current from the battery will have less current flowing through it when the starting motor is cranking the engine and more current when the starting motor is spinning free without load, because of the difference in battery voltage.

In the systems disclosed herein, new and novel arrangements are made to use the change in the counter electromotive force developed in the starting motor and the change in battery voltage for deenergizing the magnetic starting switch to disconnect the starting motor from the battery. A bimetallic element placed in a heat intercepting relationship with a heating coil connected in circuit parallel to the starting motor responds to changes in the counter-electromotive force developed in the starting motor, and the change in battery voltage, to open the circuit between the battery and the starting motor. The heating-coil-bimetallic-element combination also serves another useful purpose by delaying the reenergization of the starting motor until the starting motor comes to complete rest, a condition which is imperative to avoid faulty engagement of the starter gears.

It is fitting to mention here, that automatic restarting devices, to be effective, must provide a time delay or a waiting period to insure an "at rest" condition of both the engine and the starting motor before closing the starting motor circuit in order to prevent possible damage to the starting gears. For the starting motor, the waiting period must begin the instant the starting circuit is opened, and end after the starting motor has ceased to rotate, and may be as long as five seconds. Delays of this order can be obtained by mechanical systems such as dash pots or vibrating reeds; however such devices are expensive to manufacture. No single electrical system is capable of furnishing the necessary delay, although attempts have been made, as illustrated, for example, by United States Patents 2,165,133 to L. J. Cuthbertson and 2,021,396 to W. J. Williams.

Calorific inertia of the bimetallic elements in the systems disclosed in this application, combined with a spaced heating coil can be made to exceed the required time delay, which in view of their low cost, the reliability of operation and their long life, represent unique electrical and heat devices for accomplishing the sought results in a time delay as well as to control the opening and closing of the starting motor circuit at the precise moment.

A dependable restarting device must hold the starting motor circuit open as long as the engine is rotating under its own power, or rotating under any condition while the ignition key is turned to the "on" position, which includes loping, backfiring and back rocking. Loping is a condition of irregular engine rotation at idling speeds when the engine almost stops between explosions. Backfiring is a condition of engine rotation in the opposite direction, usually for only a very short period of time. Back rock is a condition of oscillation back and forth before the flywheel comes to rest after the engine has stalled. While the first two conditions are abnormal, the third or back rock is a condition which is likely to happen at any time.

It is admitted that these conditions are severe, and it is extremely difficult to hold the starting motor circuit open under any one and/or all of the three conditions set forth above. One of the most effective time delays so far devised, namely the vibrating reed, is inadequate to compensate for the inability of vacuum operated circuit breakers, or magnetic relays actuated by current from a generator or other energy source to meet the above conditions.

In the present disclosure, the bimetallic element or elements are not only actuated by changes in the apparent resistance of the starting motor and in the battery voltage to open the starting-motor circuit, but they are also combined with ignition circuits and with generator circuits, and with the exhaust manifold in a manner so that the starting-motor circuit remains open under all conditions of engine rotation. The calorific inertia of the bimetallic element alone is sufficient to prevent closing of the starting motor circuit until the proper moment for safe engagement of the starting gears.

It is, therefore, an object of this invention to provide an automatic restarting system for internal combustion engines in which opening and closing of the starting-motor circuit is controlled solely by bimetallic elements whose calorific inertia provides sufficient time delay for restarting the engine only after the engine and the starting motor are at complete rest.

It is an additional object of this invention to provide an automatic restarting device for internal combustion engines having a starting motor system, and an ignition system, both of which are used in combination for heating a bimetallic element or a plurality of bimetallic elements to open and to maintain open a starting-motor circuit for as long as the engine or the starting motor is rotating, the said bimetallic element or elements operating to reclose the starting motor circuit after the starting motor and the engine have come to complete rest.

It is a further object of this invention to provide an automatic restarting device for an internal combustion engine having a starting motor system and a generator, both of which are used to control the heating of a bimetallic element to open the starting-motor circuit when the engine starts and to hold the circuit open as long as the engine is rotating under its own power.

It is an object of this invention to provide an automatic starting and restarting device for internal combustion engines in which energy from the starting-motor circuit is used to heat bimetallic means for opening said starting-motor circuit after the engine has started, and in which heat from the exhaust manifold is used to hold open said starting-motor circuit as long as the engine is self-operating.

It is a further object to provide a network circuit coupled to the starting motor for the application of electrical energy to circuit elements for heating thermoresponsive means to open the starting-motor circuit after the engine has started.

It is another object of this invention to provide a Wheatstone bridge network for controlling the opening of the starting-motor circuit after the engine has started, and it is a further object to provide such a network in which the armature of the starting motor operates as one arm of the Wheatstone bridge, and the field coils operate as another arm of said bridge.

It is an object of this invention to provide a Wheatstone bridge network for operating circuit opening means to disconnect the starting motor from the battery under the following conditions, namely; when the engine starts and becomes self-operating; when the engine makes a predetermined sequence of false starts but fails to become self-operating; when, after prolonged cranking, the engine fails to start; and when, because of mechanical difficulties, the starting gears are locked and the starting motor is unable to rotate.

It is an additional object to provide bimetallic means to open and close the starting-motor circuit, and to provide ambient temperature compensation for the operation of said bimetallic means.

It is another object to provide bimetallic means for holding the starting-motor circuit open under the following conditions, namely; when the engine is self-operating; when the engine backfires; when the engine lopes at idling speed; and until both the engine and the starting motor cease their rotation when the engine has made a false start.

It is a further object of this invention to provide a vibrating mechanism coupled to the ignition system of an internal combustion engine for holding open the starting-motor circuit while the engine is self-operating.

It is another object of this invention to provide a thermal switch of the gaseous-electric-discharge-type for controlling the operation of the electroresponsive starting switch in an automatic starting system.

It is a further object to provide a glow-type switch which includes means coupled to the starting motor for opening the starting-motor circuit, and which also includes means coupled to the ignition system for holding open said starting-motor circuit while the engine is self-operating.

It is another object of this invention to provide a thermal switch of the gaseous-electric-discharge-type which includes means for limiting the amount of travel of the thermally responsive switch member when said member is holding open the starting-motor circuit in response to self-operation of the engine.

It is an additional object of this invention to provide a thermal relay in which a bimetallic element operates to open and close the starting-motor circuit, and in which means are provided to limit the amount of travel of said bimetallic element when said element is holding open said starting-motor circuit while the engine is operating under its own power.

It is also an object of this invention to provide a starting system for the engine of a motor vehicle, which system includes means for warning the operator, before starting said engine, to make certain said vehicle is not in a driving gear.

It is another object to provide an automatic starting device which includes means to prevent initial starting of the engine until another operation has been performed after the ignition switch has been turned on, and it is an additional object to provide such a device with means whereby subsequent restarting of the engine, after the first start, is made without the safety requirement of performing the second operation.

It is another object to provide an automatic restarting device for the engine of a motor vehicle which includes safety means to prevent inadvertent starting of the engine while the vehicle is in gear, which means operates to set itself "on-safety" when the ignition switch is turned off.

It is an object of this invention to provide switch means in the control circuit of an automatic starting system, which means operates to open the starting-motor circuit after said circuit has been closed a predetermined length of time. It is a further object to provide such a device which includes manually operable means to reset said switch means, and which also includes visual means to indicate the opening of said starting-motor circuit.

The novel features which I believe to be characteristic of the invention, including their organization and method of operation, together with further objects and advantages thereof, will be better understood from the following description considered in connection with the accompanying drawings in which several embodiments of the invention are illustrated by way of examples. It is to be expressly understood, however, that the drawings are for the purpose of illustration and description only, and are not intended as a definition of the limits of the invention.

Fig. 1 through Fig. 5 are schematic diagrams of automatic restarting systems for internal combustion engines in which bimetallic elements are used to control the opening and closing of starting motor circuits.

Figs. 6 and 7 are schematic diagrams of automatic restarting systems for internal combustion engines using bimetallic elements enclosed in gas filled tubes to control the opening and closing of starting-motor circuits.

Figs. 8 and 9 are schematic diagrams of automatic restarting systems for internal combustion engines in which exhaust gases of an engine are used to heat a bimetallic element for holding the starting circuit open while the engine is running.

Fig. 10 is a cross section of the control unit taken on line 10—10, of Fig. 9 showing the unit attached to an exhaust manifold.

Fig. 11 is taken on line 11—11, Fig. 10, and shows the radial relationship between the bimetallic elements shown in Fig. 10.

Figs. 12 and 14 are schematic diagrams of additional automatic restarting systems for internal combustion engines showing bimetallic elements enclosed in gas filled tubes.

Fig. 13 is another schematic diagram of an automatic restarting system for internal combustion engines in which the resistance of a bimetallic element serves as its own heat generator to open the starting-motor circuit.

Fig. 15 is a cross section taken on line 15—15 of the gas filled tube shown in Fig. 14.

Figs. 16, 18 and 19 are schematic diagrams of automatic restarting systems for internal combustion engines showing vibrator means to control the heating of bimetallic elements for holding starting motor circuits open while the engine is running.

Fig. 17 is a schematic illustration of a bimetallic timing relay for preventing useless and prolonged periods of engine cranking in an automatic restarting system.

Fig. 20 is a schematic illustration showing an automatic restarting system for internal combustion engines which system uses engine driven contacts to control the heating of a bimetallic element to hold a starting motor circuit open while the engine is running.

Fig. 21 is another schematic illustration of an automatic restarting system using direct and induced currents to heat a bimetallic element for controlling a starting-motor circuit.

Fig. 22 is a schematic illustration of an automatic restarting system showing an inexpensive magnetic relay responsive to voltage in a starter and generator circuits for connecting the heater coil of a thermal relay which controls the starting-motor circuit.

Fig. 22a is a network diagram of the starting-motor circuit in Fig. 22, and of the starting-motor circuits in the systems shown in the Figs. 1 through 21.

Fig. 23 is a schematic illustration of an automatic restarting system in which a thermal relay is shown connected to a starting motor at the junction of the field coils and the starting motor. A holdout potential is obtained from a Wheatstone bridge circuit coupled to the primary circuit of the ignition system.

Fig. 23a is a network diagram of the starting-motor circuit in Fig. 23.

Fig. 24 is a schematic illustration of an automatic restarting system incorporating a network circuit of the Wheatstone bridge type which includes the field coils and the armature of a starting motor for supplying current to the heater coil of a thermal relay.

Fig. 24a is a network diagram of the starting-motor circuit in Fig. 24.

Fig. 25 is a performance chart of a conventional starting motor for an internal combustion engine.

In each of the Figs. 1 through 9, 12 through 14, 16, and 18 through 24 the internal combustion engine and the starting gears for rotatively connecting the starting motor to the engine have been omitted from the drawings, however their inclusion in each of the schematic diagrams is understood.

Referring to Fig. 1, a battery 10 is connected to an ignition switch 12 and to an upper contact 13 of the magnetic switch 14, the lower contact 15 of this switch being connected to a starting motor 16. The starting motor and the positive pole of battery 10 are grounded with the result that when contactor 17 of switch 14 closes contacts 13 and 15, motor 16 becomes connected across battery 10. The ignition switch 12 forms a series circuit with the primaries 18 and 20 of the step-up transformer 22 and of the ignition coil 24, respectively, and with the breaker arm 26, moving contact 27 and grounded stationary contact 28. A condenser 29 is connected across the contacts 27 and 28 which performs its usual function of protecting the contacts and furnishing additional energy to the ignition circuit upon opening of the contacts by a cam 30. The secondary 31 is connected to a distributor 32 and a plurality of spark plugs 33, which complete the circuit of the ignition system. The secondary 34 of transformer 22 is connected across a heater element or coil 35 wound around a bimetallic element 36 mounted on a stationary terminal block 37 which is connected to battery 10 over conductors 38 and 39. The second heating coil 40, wound in parallel with coil 35, but insulated from coil 35, is also wound around the bimetallic element 36, and is grounded, at 41, on one side, while its other side is connected by means of conductor 52 to a conductor 42. A second bimetallic element 43 is mounted on a stationary conductive block 44; the two elements 43 and 36 being provided with contacts 45 and 46 which are normally closed when the engine is at rest. A condenser 47 may be connected across the primary 18 to furnish a low impedance path for the higher frequency spectrum of frequencies usually present on the primary side of the ignition circuit.

The operation of the disclosed automatic restarting circuit is as follows: upon closing of switch 12 switch 14 becomes energized thus closing contacts 13 and 15 with its contactor 17 and connecting starting motor 16 to battery 10. Through suitable gearing (not shown) the motor 16 engages the flywheel of the engine (not shown) and rotates the engine until it is started. Because of the load at the time motor 16 rotates the engine, the motor's rotational speed is low, therefore, the counter-electromotive force in the motor is low, with the result that its resistance is also low. Thus, only low IR drop exists across motor 16, and, because of the internal resistance of the battery, the battery voltage in conductor 42 drops accordingly. With low battery voltage in conductor 42, only low current will flow through heater winding 40 at this time, and contacts 46 and 45 remain closed. When the engine starts, motor 16 disengages the engine and the counter-electromotive force increases because of the increase in the speed of its rotation. The voltage on conductor 42 rises which increases the current flowing through heater coil 40 sufficiently to heat the bimetallic element 36 to the temperature sufficiently high to produce differential expansion within the latter. This differential expansion is in the direction to open contacts 46 and 45, and thus open the circuit of switch 14. Opening of switch 14 opens the motor circuit and the latter comes to rest. Upon starting of the engine, the ignition circuit becomes operative and the primary current flowing through conductors 39, 48, primary 18, conductor 49, primary 20, breaker arm 26 and contacts 27 and 28 induces a secondary current in the secondary 34 of transformer 22. This current flows through heater coil 35 thus continuing to heat the bimetallic element 36 to that temperature which is necessary to maintain contacts 45 and 46 in open condition. Therefore, the starting switch circuit, including coil 50, remains open.

If the engine stalls, heater coil 35 is without current, therefore it cools, and contacts 45 and 46 close after sufficient time has elapsed for the engine to come to rest because the calorific inertia of the bimetallic element 36 is sufficiently high to maintain the circuit of coil 50 open for the desired period of time. Upon closing of contacts 45 and 46, winding 50 becomes energized and motor 16 restarts the engine. The same calorific inertia of the bimetallic element is sufficiently high to furnish the necessary time delay if the engine stops before motor 16 comes to rest, which time delay allows motor 16 to stop before contacts 45 and 46 close.

There is an additional abnormal function of the engine which should be taken into consideration in analyzing the performance of an automatic restarting system: the starting motor 16 must remain disengaged when the engine "lopes" or "back-fires." This disengagement is indeed the case with the disclosed system, since under such conditions the primary ignition circuit is still in operation and therefore sufficient energy is delivered to coil 35 to maintain the contacts 45 and 46 open, which energy is the minimum amount required to keep these contacts open; and therefore, the parameters of the circuit, including transformer 22, coil 35, and bimetallic element 36 must be proportioned to meet this requirement. It should be mentioned here that the calorific inertia will again help to keep the circuit open under such adverse conditions.

The bimetallic element 43 is used to provide automatic compensation for any changes in ambient temperature.

To provide a greater spread between the voltage supplied to heater coil 40, while motor 16 is rotating the engine, and voltage supplied to that coil when said motor is spinning free without load, a relay 6, to be described in connection with Fig. 9, may be inserted in conductor 52. Also, a safety relay 1201, to be described in connection with Fig. 12, may be inserted in conductor 38. A second safety relay 8, to be described in connection with Fig. 17 may be inserted in the conductor between coil 50 and terminal block 44.

Fig. 2 discloses a modification of Fig. 1, in which the secondary 200 is coupled to a primary 202 of the ignition coil 204, as shown, or it may be mounted on the same core with the primary either in overlayed relationship or in tandem. The secondary 200 is connected in series with the heater coil 206 which is now grounded through a conductor 208 and the starting motor 16. Bimetallic element 210, which is the only bimetallic element in this system, now has only one heater coil 206, which coil is connected to the conductor 42 and is coupled to the ignition circuit 12, 48, 202, 26, 27, 28 and battery 10 through the grounded secondary 200.

The operation of the circuits in Fig. 2 does not differ materially from that in Fig. 1. A rise in the potential on conductor 42 increases the current flowing through coil 206, this increase in current is sufficient to heat bimetallic element 210 enough to separate contacts 46 and 45 which interrupts the flow of current in coil 50 of switch 14. Deenergizing switch 14 disconnects starting motor 16 from battery 10. Self-operation of the engine induces current in secondary 200, which "takes over" heating of the bimetallic element 210, the secondary current now flowing through secondary 200, heater coil 206, conductor 208, starting motor 16 and grounds 212 and 214. A condenser 216 may be connected across the armature of motor 16 to decrease the impedance of the above circuit at high frequencies if it should be necessary.

A negative resistance 218 may be inserted in conductor 208 to decrease the amount of heating produced in coil 206 when motor 16 is cranking the engine. The resistance of the negative resistance decreases when the voltage on conductor 42 rises after motor 16 disconnects itself from the engine. It is to be noted that relay 8, and relay 901, may be added to the circuit embracing coil 50 for reasons explained in connection with Fig. 17 and Fig. 9.

Fig. 3 is an additional modification of the automatic starting circuit. In Fig. 3, a condenser 300 is connected in series with heater coil 302, which is grounded at 304. Therefore, condenser 300 and heater coil 302 of the bimetallic element 306 are connected across contact points 27—28. When contact points 27—28 open, condenser 300 acts in its usual manner in combination with the primary 20 of ignition coil 24, the two acting as an oscillatory circuit with transfer of energy from coil 20 to condenser 300 and vice versa.

This oscillatory current passes through the heating coil 302, and causes sufficient heating of bimetallic element 306 to separate contact 308 and stationary contact 310, thus opening the circuit of coil 50 of switch 14 after the engine is started. Sufficient calorific inertia is introduced into this combination to allow for opening the circuit of coil 50 only after starting of the engine.

It is a well recognized fact that in designing the parameters of the coil 20-condenser 300 combination, the resistance in contact 27—28 condenser 300 circuit should be kept low for increasing the life of the contacts 27—28. Therefore, to protect contacts 27—28 a condenser 312 may be introduced across contacts 27—28 and the capacitances of the condensers 312 and 300 adjusted to divide the transient current between the two, condenser 300 being made sufficiently large to produce adequate current in the heating coil 302. The effect of the resistance of coil 302 on the life of contacts 27—28 obviously may be minimized by making the bimetallic element sufficiently sensitive but commensurate with the pressure required for proper operation of the contacts 308—310. The remaining functions of the circuit are identical to that illustrated in Figs. 1 and 2, with the exception that separate bimetallic element 314 and heater coil 316, identical to coil 40 in Fig. 1. separates contacts 320 and 310 thereby opening the circuit of coil 50 after starting motor 16 becomes disengaged from an engine and the voltage across its terminals consequently increases. It is to be noted, in connection with Fig. 3, that relay 1201, Fig. 12, and relay 6, Fig. 9, and relay 8 Fig. 17, may be added to the circuits as indicated by dotted circles.

Fig. 4 discloses a circuit in which a generator 400 or any other source of potential responsive to engine rotation, is used for connecting the heating coil 402 of a bimetallic element 404 to a battery 10. As in the case of Fig. 1, this automatic restarting system is provided with an ambient temperature compensating bimetallic element 401 which performs the same function as element 43 in Fig. 1. The functioning of the restarting circuit connected to the starting motor 16 is identical to those illustrated in all prior figures, except that its circuit is now completed through conductor 52, heater coil 402, conductor 406, contacts 407, 408, bimetallic strip 409 for ambient temperature compensation, terminal block 410, conductor 411, armature 412, contacts 413, 414, ground 415, ground 416, battery 10, conductor 39, contacts 13 and 15 and bar 17, and conductor 42, which completes the above circuit. As in the prior figures, when motor 16 becomes disconnected from the engine, the potential in conductor 52 rises, the current flowing through the heater coil 402 increases, bimetallic element 404 travels downward, and contacts 417 and 418 open; thus deenergizing coil 50 of switch 14. This opens contacts 13 and 15, and motor 16 becomes disconnected from battery 10. If the engine stops, contacts 417, 418 reclose, and motor 16 restarts the engine.

If the engine starts, the voltage generated by generator 400 is impressed on a conductor 420 and a coil 422 with the result that relay 424 becomes energized transferring contact 413 from contact 414 to contact 425. Since ignition switch 12 is now in closed position, the heating coil 402 is connected to battery 10 through conductor 39, switch 12, conductor 38 and conductor 426, contacts 425, 413, armature 412, conductor 411, metallic strip 409, contacts 408—407, conductor 406, heater coil 402, conductor 52, motor 16, ground 427 and ground 416, which completes this circuit. Therefore, as long as the engine is running, relay 424 remains energized, and the heating coil 402 remains connected to battery 10, which maintains contacts 417 and 418 open so long as the motor is running.

Since the bimetallic element 404 must open contacts 418 and 417 relatively quickly after the engine is started, it becomes necessary to adjust the calorific inertia of the element and of the heating coil 402 to the time constant which is encountered at this portion of the operating cycle of the restarting system. After the engine is started, the heating coil 402 becomes connected to battery 10 for a longer period of time, i. e. for as long as the engine is running, if it were not for contacts 407, 408, and, therefore, the bimetallic element 404 would become heated to an unnecessarily high temperature. To prevent this high temperature, contacts 407, 408, bimetallic element 409, and an insulating block 430 are provided. Strip 409 is deflected downwardly by the bimetallic element 404 when the latter becomes overheated. This in turn opens contacts 407, 408, thereby disconnecting battery 10 from the heating coil 402 and permitting element 404 to return to its normal operating temperature, which is the temperature at which contacts 417, 418 remain open. Therefore, the function performed by the contacts 408 and 407 is to maintain the bimetallic element at proper temperature level even if the heating current flowing from battery 10 through conductor 426, etc. (when the engine is self-operating) may exceed the magnitude which is necessary for keeping contacts 417 and 418 open. Stated differently, contacts 407, 408 act as an automatic temperature regulating means for the bimetallic element 404 when the engine is in running condition.

The above automatic temperature regulating means may be eliminated altogether by inserting a resistance 432 and a conductor 434 in the above circuit in which case the bimetallic element 409, contacts 407, 408 and terminal 410 are eliminated altogether and conductors 411 and 434 become one single conductor connecting armature 412 to the heating coil 402. In this case the value of resistance 432 is adjusted to maintain the current through coil 402 at proper value when the engine is running. Relay 6 to be described in connection with Fig. 9, may be incorporated in conductor 52 to provide a greater spread between the voltage supplied to heater coil 402 during cranking and the voltage supplied to that coil when the starting motor has no load and is spinning free. In this case resistance 932 of relay 6, will operate as a substitute for resistance 432.

A safety relay 1201, to be described in connection with Fig. 12, and/or a relay 8, of Fig. 17, may be inserted in the circuit embracing coil 50, of switch 14, if desired.

Fig. 5 is an additional modification of a restarting circuit which combines some of the features of the circuits disclosed in Figs. 1, 2 and 4. A heating coil 500 is connected to the secondary 34 of transformer 22, identical to the transformer illustrated in Fig. 1. However, in this case the circuit of the secondary 34 is as follows: grounded secondary 34, heating coil 500, conductor 208, and grounded starting motor 16. Therefore, this circuit is identical to the one illustrated in Fig. 2 for secondary 200 except that while in Fig. 2, secondary 200 is a part of the ignition coil 204, in Fig. 5, it is a part of transformer 22, identical to the similarly numbered transformer in Fig. 1. The circuit of battery 10 is identical to the one illustrated in Fig. 2: grounded battery 10, contactor bar of switch 14, conductor 42, conductor 208, heating coil 500 and grounded secondary 34. Bimetallic element 43 and contacts 45 and 46 correspond to the similarly numbered elements in Fig. 1 and are used for closing and opening the circuit of switch coil 50. In addition, bimetallic element 43 acts as an ambient temperature compensator. Contacts 502, 504, bimetallic element 506, terminal block 508, resistance 510 and junction point 512 perform the same function as element 409 and its associated circuits in Fig. 4, that is, they regulate the temperature of bimetallic element 501, when its heating is performed by the secondary 34, which in effect is the low tension side of the ignition circuit. This temperature regulation of element 501 is obtained by closing of the contacts 502 and 504 by element 501 which if it becomes overheated, connects the secondary 34 to a parallel circuit one leg of which is resistor 510, element 506, contacts 504, 502 and grounded element 501. The other parallel circuit is through heater coil 500, conductor 208 and grounded motor 16. Division of current from secondary 34 between the two parallel branches lowers the temperature of coil 500 with concomitant lowering of the temperature of element 501, which, in turn, reopens contacts 502 and 504. Thus, the system disclosed in Fig. 5, uses a single heating coil for heating the single, main bimetallic element 501, which is heated first by battery 10 when the engine is started, and then from the low tension side of the ignition system after the engine is started. Ambient temperature compensation is provided for contacts 45 and 46 by bimetallic element 43, and for contacts 502 and 504 by bimetallic element 506. It should be mentioned here that resistance 510 is inserted in temperature regulating means to decrease the effect of this feature on the low tension side of the ignition system through secondary 34. It may be also mentioned here that the use of this temperature regulating circuit is optional and its elimination in Fig. 5 is more apparent than is the case in Fig. 4: in Fig. 4 coil 402 becomes connected directly to battery 10, which, over a long period of time, may produce occasional overheating of coil 402. The probability of overheating is less likely to occur in Fig. 5, since proper parameters of transformer 22, normally, should eliminate the necessity of any additional temperature regulating means.

A relay 6 to be described in connection with Fig. 9, may be inserted in conductor 208 if it is desired to provide a greater difference between the voltage supplied to heater coil 500 during cranking and the voltage supplied to that coil when the starting motor has been disconnected from the engine. In this case, the resistance 932, Fig. 6, is proportioned to meet the requirements of heater coil 500 and secondary 34. A safety relay 1201, to be described in connection with Fig. 12, and/or relay 8, of Fig. 17, may be inserted in the circuit embracing coil 50, of switch 14, if desired.

Fig. 6 discloses a novel gas filled tube incorporated in the restarting system. Other versions of the structures of such tubes are disclosed in Figs. 12 and 14 and will be described later. The heating circuit of battery 10 is identical to the previously described circuits, and is as follows: battery 10, bar 17, conductors 42 and 52, and grounded heating coil 602 placed in the vicinity of a bimetallic element 604 which is connected in series with coil 50 of switch 14 through contacts 606 and 608. A rise in voltage on conductor 52, after motor 16 becomes disconnected from the engine, increases the current flowing through heater coil 602, which disconnects coil 50 from battery 10 after sufficient heat has been absorbed by bimetallic element 604. After the engine is started, element 604 is heated again by the energy supplied by the low tension side of the ignition system. As in the preceding figures, the secondary 34 furnishes this energy through an electrode 610 placed within the tube in the vicinity of element 604. The secondary 34 has sufficient number of turns and the gas between electrode 610 and element 604 are proportioned to produce ionization within tube 600 and glow discharge between the two electrodes 610—604, the latter being the bimetallic element. This discharge maintains the temperature of electrode 604 sufficiently high to maintain contacts 606—608, open as long as the engine is running. The gap between the electrodes 604—610 is dimensioned to avoid closing of the gap after glow discharge is established. The amount of deflection produced in electrode 604 is a function of glow discharge current. The magnitude of this current is limited by the impedance of transformer 22 which acts as a current limiting device after glow discharge is established. Accordingly, a stable glow discharge condition is maintained primarily because of this current limiting effect produced by the transformer, and the necessity of including conventional current limiting impedance in this circuit is avoided. It should be mentioned here that it is desirable to operate tube 600 in the glow discharge region because it will produce maximum heating effect on the bimetallic element 604, the discharge being distributed over a large area of the element. As indicated in the illustration a relay 6, to be later described, may be inserted in conductor 52 if it is desired to provide a greater difference between the voltage supplied to heater coil 602 during cranking and the voltage supplied to that coil when the starting motor has been disconnected from the engine. A safety relay 1201, to be described in connection with Fig. 12, and/or relay 8, of Fig. 17, may be inserted in the circuit embracing coil 50, of switch 14, if desired.

Fig. 7 discloses application of the teachings of Fig. 6 to the high tension side of the ignition system. In this case the high tension coil 700 is connected in series with a distributor 702, grounded spark plugs 704, grounded bimetallic element 706 and electrode 708. Therefore, the discharge through the spark plugs takes place in series with the discharge across the gap between the electrodes 706 and 708 of the gas filled tube 710. This being the case, sufficient voltage should be developed by the secondary 700 to produce the necessary breakdown across the spark plug gap and the spacing between the electrodes within the tube. Since the gas within the tube is of the type and under proper pressure so that only low voltage will be necessary to produce ionization in the tube, then the main voltage drop, obviously, will be across the gap between the electrodes of the spark plug. Since the area of the electrodes in tube 710 is relatively large, and there is complete ironization of the gaseous medium, tube 710 will not act as a current limiting element in the secondary circuit. The current will be limited by the impedance of the secondary winding 700 and gap 704 of the spark plug. As in the case of Fig. 6, tube 710 should be operated in the glow region, this glow discharge path being in series with the arc discharge across gap 704. The functioning of this circuit otherwise is identical to the one disclosed in Fig. 6. The advantage of the circuit disclosed in Fig. 7 over that disclosed in Fig. 6 is self-evident. The only additional element which is introduced here into a conventional ignition system of an internal combustion engine is a gas-filled tube 710 and the use of an additional transformer 22 is eliminated altogether. At the same time the ignition coil 712, and especially the secondary 700 now must withstand full secondary voltage at both ends and its insulation must be commensurate with this modification.

As indicated by a dotted circle, a relay 6, to be described in connection with Fig. 9, may be inserted in the circuit between conductor 42 and heater coil 602, if it is desired to provide a greater difference between the voltage supplied to heater coil 602 during cranking and the voltage supplied to that coil when the starting motor has been disconnected from the engine after the engine has started.

A safety relay 1201 of Fig. 12, and/or relay 8 of Fig. 17, may be inserted in the circuit embracing coil 50 of switch 14, if desired.

Fig. 8 discloses an automatic restarting system in which the bimetallic element 36 and its heater coil 40 are identical to the similarly numbered elements in Fig. 1, and they function in the same manner as those in Fig. 1. Therefore, no additional description of those elements is necessary. The modification resides in the use of heated gases, present in an exhaust manifold 800 immediately after the engine is started, for heating a bimetallic element 802 placed within the manifold on a bracket 804 held by a threaded plug 806 screwed into the wall of the manifold 800. Hot gases within the manifold heat bimetallic element 802, which, while expanding, pushes a push rod 808. The outer end of the rod pushes a spring 810 equipped with contacts 811 and 812 connected in series with contacts 45 and 46 by a conductor 813. Actuation of spring 810 opens contacts 812—811 which opens the circuit of winding 50 of the starting switch 14, or keeps it open after it has been opened by the bimetallic element 36. Proper functions of the restarting system disclosed in Fig. 8 is insured by making the calorific inertia of the bimetallic element 36 and coil 40 sufficiently large to maintain contacts 45—46 open until the calorific inertia of the bimetallic element is overcome by the heat furnished by the exhaust gases. As indicated by a dotted circle, a relay 6, to be described in connection with Fig. 9, may be inserted in conductor 52 between conductor 42 and heater coil 40 if it is desired to provide a greater difference between the voltage supplied to heater coil 40 during cranking and the voltage supplied to that coil when the starting motor has been disconnected from the engine after the engine has started. In addition, a safety relay 901 described in connection with Fig. 9, and/or a relay 8 described in connection with Fig. 17 may be inserted in the circuit embracing coil 50 of switch 14, if desired.

Figs. 9, 10 and 11 disclose a system similar to the one disclosed in Fig. 8 in that an electrically heated bimetallic element is used for opening the starting-motor circuit after the engine is started, and a second bimetallic element heated by exhaust gases is used for keeping this circuit open so long as the engine is running. The system also incorporates a safety relay 901 which prevents starting of the engine without a second operation at the time the ignition switch 12 is turned on, this serves as a warning that the engine should be disconnected from the drive shaft either at the clutch or the gear box before the engine can be started. In the disclosed system the second operation is performed by depressing a grounded clutch pedal 900 which grounds relay coil 902 through contacts 903 and thus closes relay armature 904, and contacts 906 and 908. Closing of contacts 906 and 908 closes the circuit of switch coil 50, through battery 10, conductor 39, ignition switch 12, conductor 905, armature 904, contacts 906 and 908, conductor 909, coil 50, conductor 910, bimetallic element 912, contacts 913, 914, rotatable arm 915 and ground 916. Closing of this circuit energizes winding 50, which in turn causes contactor 17 to bridge contacts 13 and 15, and energizes motor 16. After the engine is started, starting motor 16, having no load, increases its speed and allows the battery voltage to return to near its normal open circuit value in the manner as previously described. Relay 6, having a relay coil 926 connected to conductor 42, responds to the return to normal battery voltage by closing the normally open contacts 928 and 930. Closing contacts 928 and 930 establishes a circuit in parallel with resistor 932 to provide a means whereby heating coil 917 of the bimetallic element 912 receives more current from battery 10 than when motor 16 turns the engine, and after a predetermined delay, contacts 913 and 914 open which deenergizes winding 50, which in turn disconnects motor 16 from battery 10. Resistor 932 is proportioned to supply the desired current to heater coil 917 so as to preheat bimetallic element 912 during engine cranking. The amount of preheating minimizes the time delay between the closing of contacts 928 and 930, and the opening of contacts 913 and 914. From the above description it follows that the circuit of winding 50, and of the heating coil 917 operate in a manner similar to the circuit of the same coil 50 and of the heating coil 40 of the bimetallic element 36 in Fig. 1. The difference resides in the introduction of relay 6, the auxiliary relay 901, clutch pedal 900, which must be depressed to close contacts 903 before relay coil 902 becomes effective, and mounting of the bimetallic element 912 on a rotatable disc 918, the operation of which is hereafter described. The circuit of relay coil 902 includes a grounded resistance 920 whose value is such that relay coil 902 closes contacts 906 and 908 only when contacts 903 are closed by action of clutch pedal 900, since the amount of current flowing through winding 902 with resistance 920 in the circuit is sufficient to hold armature 904 but not sufficient to move it. However, when contacts 903 are closed by the clutch pedal 900, resistance 920 is shunted by contacts 903, and sufficient current flows through winding 902 to attract armature 904 and close contacts 906 and 908. Once the armature is closed, it will remain in its closed position even when the winding current is reduced to a lower value by the resistance 920. Therefore, when clutch pedal 900 is released after winding 902 is enregized, contacts 906 and 908 will remain closed as long as ignition switch 12 is in the "on" position. It will become more apparent from the description which follows, that this mode of operation of relay 901 makes this relay instrumental in the initial operation of the starting system, i. e. energization of relay 901 becomes a necessity before the engine can be started. Once the contacts 903 have been closed and coil 902 is energized sufficiently to close contacts 906 and 908, adequate current flows through resistance 920 to hold contacts 906 and 908 closed to provide fully automatic restarting, after the first start, and as long as the ignition switch is turned "on." Relay 901 makes it impossible to make the first start with the car in gear.

In Fig. 10, the disc 918 preferably made of insulating material, is shown rotatably mounted in a housing 1000 by means of a shaft 1002 extending through a bearing formed by boss 1004. A shoulder 1006 formed on the shaft 1002 bears against a friction washer 1008 under the influence of spring 1010, compressed between pin 1014, washer 1012 and housing 1000. The force of spring 1010 causes pressure between shoulder 1006 and washer 1008, thus, rotation of the disc is restrained by friction between shoulder 1006 and washer 1008, and washer 1012 and pin 14. This friction arrangement is shown as an example only.

Threaded into an exhaust manifold 1022 of an internal combustion engine (not shown) tubular member 1016 supports housing 1000 by means of flanged disc 1018. Arm 915, fixed to one end of a second shaft 1024 extending through the tubular member 1016, is free to rotate in flanged disc 1018 and in bearing disc 1026. Besides acting as a bearing, disc 1026 retards the flow of exhaust gases into the tubular member 1016.

Fixed to the other end of shaft 1024 is the free end of a spiral bimetallic element 1028 while the other end of the bimetallic element is fixed to the stationary lug 1030 extending from the tubular member 1016. As shown in Fig. 10, the bimetallic element 1028 projects into the exhaust manifold 1022. In this position, exhaust gases passing through the manifold will heat the bimetallic element, and since the thermal expansion properties of the components forming the bimetallic element provide the element with the ability to change curvature with changes in temperature, it follows that temperature changes in exhaust manifold 1022 will cause the bimetallic element 1028 to rotate shaft 1024 and rotate arm 915 to open and close contacts 914 and 913.

The operation of the disclosures in Figs. 9, 10 and 11 is as follows: Closing ignition switch 12 connects conductors 48 and 905 to battery 10 by means of conductor 39. This causes current to pass through coil 902, resistance 920, and back to battery 10 by way of common ground connections. But, nothing happens, and thereby a warning is provided to the operator to disconnect the engine from the driving wheels by depressing the clutch pedal or moving the gear shift lever to neutral, therefore, by depressing clutch pedal 900 contacts 903 bypass resistance 920 and allow full current to flow through coil 902. Armature 904 moves toward the core inside coil 902 and contacts 906 and 908 are closed. Now, from conductor 905 current flows through contacts 906, 908 and conductor 909 into coil 50, of magnetic switch 14, thence into conductor 910, bimetallic element 912, contacts 913 and 914, and back to the battery through common ground connections.

Energizing coil 50 causes contactor 17 to bridge contacts 13 and 15 whereby starting motor 16 is connected to battery 10. Through suitable gearing, the starting motor cranks the engine until combustion occurs within the engine and it becomes self-operating. As previously described, when coil 50 is energized and current flows into the starting motor 16 current also flows into heating coil 917 through relay 6, also, when the engine is started there is an increase in the flow of current through coil 917. This increased flow is sufficient to heat bimetallic element 912 so as to separate contacts 913 and 914. This action interrupts the flow of current through coil 50, resulting in the interruption of current flowing into the starting motor. Bimetallic element 912 quickly cools and returns to its normal position, however, contact 913 does not engage contact 914 because hot exhaust gases from the running engine have heated bimetallic element 1028, Figs. 10 and 11, causing it to develop torque such as to rotate shaft 1024 in a counter clockwise direction and move arm 915 and contact 914 in the direction of stop 922. Moving arm 915 until it touches stop 922 requires only a small amount of heat applied to element 1028. Therefore, disc 918 which supports stop 922, as well as the bimetallic element 12, is rotated by spiral bimetallic element 1028 by means of shaft 1024 and arm 915. When element 1028 is heated the rotation of disc 918 is in a counter clockwise direction, and when it cools, the element will rotate arm 915 in a clockwise direction closing contacts 914 and 913. Bimetallic element 912 transfers this clockwise rotation to the disc 918 through its anchor block 924 mounted on disc 918.

Rotation of disc 918 by bimetallic element 1028, makes it possible for contacts 914 and 913 to respond to slight changes in temperatures even though bimetallic element 1028 is subjected to wide changes of temperature.

In Fig. 11, lug 1030 is shown in full line while the tubular member of which the lug is a part, is shown in dotted line so as not to obscure the respective angular relationship between spiral bimetallic element 1028, shaft 1024, arm 915, contacts 914 and 913 and stop 922 and the end of arm 915 is small, so that a slight angular rotation of said arm would bring it in contact with stop 922. The slight angular rotation represents only a few degrees change in temperature; therefore, if the engine stalls exhaust gases will no longer fill the manifold and the internal temperature will drop sufficiently in a very short time to cause bimetallic element 1028 to rotate shaft 1024 in a clockwise direction to close contacts 914 and 913, whereupon the restarting cycle will begin.

Fig. 12 discloses a restarting circuit using a gas-filled tube 1200 and a safety relay 1201.

Before describing the entire restarting circuit, a description of tube 1200 will be given first. The tube is identical to the gas-filled tubes 600 in Fig. 6 and 710 in Fig. 7. While in Figs. 6 and 7 the tube is illustrated in a diagrammatic form, in Fig. 12, one of the preferred configurations of the electrodes is illustrated more in detail. The tube 1200 consists of a glass envelope 1202 having a glass press 1203, which is illustrated diagrammatically by a heavy line. Four terminal studs 1204, 1205, 1206 and 1207 pass through the glass press 1203. Studs 1204 and 1206 are used for supporting a heater coil 1208, stud 1206 being also used for supporting a U-shaped bimetallic element 1209, one end of which is welded to stud 1206 while the free end normally makes contact with stud 1205. A U-shaped electrode 1210 is welded with its terminal end 1211 to stud 1207, while the U-shaped portion 1210 is placed in spaced relationship with respect to the bimetallic element 1209 and directly over the latter, in the plane of the drawing. The envelope is filled with any inert gas such as hydrogen, argon, mercury, helium, nitrogen, neon, krypton or xenon having a pressure such that optimum conditions for ionization exist. The operation of the tube is as follows: normally bimetallic element 1209 makes contact with the stem 1205 and, therefore coil 50 of relay is normally grounded through stem 1205, bimetallic element 1209 and grounded stem 1206. The current carried by bimetallic element and its resistance are not sufficiently large to produce appreciable deformation in the bimetallic element 1209, and therefore it rests against stud 1205. When sufficiently large current passes through the heater coil 1208, however, the bimetallic element 1209 is heated sufficiently to travel counterclockwise with its free end with the result that contact between stud 1205 and the bimetallic element is opened. This will continue as long as the heater coil 1208 remains hot. The heater coil 1208 is not the only means for keeping this contact open. If sufficiently high voltage is impressed across electrode 1210 and the bimetallic element 1209, gas within the tube will become ionized and there will be a glow discharge between the two electrodes. The voltage impressed across the electrodes and the current carrying capacity of the circuit or its impedance should be such as to produce glow discharge rather than arc discharge since more uniform heating of the bimetallic element is obtained by using glow discharge rather than arc discharge. As long as the glow discharge continues the two contacts will remain open. Thus the tube has two separate means for maintaining the open position of the bimetallic element with respect to stud 1205, which are heating coil or filament 1208, and glow discharge between the bimetallic element electrode 1209 and the outer electrode 1210.

The operation of the restarting circuit in Fig. 12 is as follows: After switch 12 is closed, current will flow through a relay coil 1214 of relay 1201, but relay armature 1215 will not close contacts 1216 and 1217 since the attractive force of the relay coil 1214 is made too low to actuate armature 1215. Therefore to close contacts 1216 and 1215, push button 1213 must be pushed in to bring armature 1215 closer to the iron core of relay 1201 whereupon relay armature 1215 will remain energized. Thus the need for pushing on push button 1213 acts as a reminder that the engine must be disconnected from the wheels of the automobile before the push button 1213 is pushed in. After contacts 1216 and 1217 are closed, switch 14 becomes energized, the circuit being completed through a conductor 1218, and bimetallic element 1209; whereupon motor 16 cranks the engine; the engine becomes self-operating and a rise in voltage on conductor 1219 heats filament 1208 to produce opening of the circuit of winding 50 at stud 1205 and bimetallic element 1209. This disconnects motor 16 from battery 10. After the engine becomes self-operating, the bimetallic element is heated by the glow discharge between the electrodes 1210 and 1209, high ionization voltage being furnished by the transient voltage appearing across condenser 29 connected in series with the primary winding 20 of the ignition coil 24.

If the engine is accidentally stalled, bimetallic element makes contact with stud 1205, which energizes switch 14, connecting motor 16 to battery 10, and motor 16 recranks the engine. It should be mentioned here that once button 1213 has closed contacts 1216 and 1217, armature 1215 remains energized as long as ignition switch 12 remains closed; therefore, relay 1201 does not participate in the restarting cycle. Condenser 1220 may be used to divide the transients flow between two parallel circuits, one through condenser 1220 and the other through the gas-filled tube 1200, thus providing control over the amount of heating imparted to the bimetallic element 1209 by the ignition circuit.

Fig. 13 does not differ in its essential elements from what is illustrated in Fig. 1. The difference resides in the elimination of the heater coil 40 of Fig. 1 and substitution of the bimetallic element of sufficiently high resistance so that the current supplied by battery 10, after motor 16 is disconnected from the engine, heats this element directly rather than through coil 40, as is the case in Fig. 1. Fig. 13 also includes a safety relay 901 identical to the relay 901 illustrated in Fig. 9 except that a push button 1302 is used for grounding relay 901 rather than the clutch pedal 900 of Fig. 9. The operation of this circuit otherwise is identical to the operation of the circuit of Fig. 1 and, therefore, needs no additional description, since the operation of relay 901 has been described in connection with Fig. 9.

Fig. 14 includes most of the features of Fig. 6 in that transformer 22, in series with the primary side of the ignition circuit, is used once more for producing glow discharge across the electrodes 1401 and 1402 of a gas-filled tube 1400. The tube differs from tube 1200 in Fig. 12 in that the heating coil 1208 has been eliminated and a high resistance bimetallic element has been substituted for the combination of the filament bimetallic element used in tube 1200. Since bimetallic element 1402 has sufficiently high resistance, the current passing through coil 50 of magnet 14 is sufficient to produce the necessary heating of the bimetallic element 1402 and consequent opening of contacts. The functioning of the circuit in other respects is identical to that described in connection with Fig. 6.

The tube may be provided with a magnet 1403 and a magnetic bar 1404 to provide a more positive engagement of contacts, to increase the time delay of the bimetallic element and to increase the temperature differential which will be necessary to produce closing and opening of the contacts within the tube. See Fig. 15.

Fig. 16 discloses a restarting system in which the magnetic flux produced by the magnetic core 1600 of the ignition coil 24' is used for energizing an armature or a vibrating reed 1602 for producing an alternating current in the primary winding 1604 of a transformer 1606 whose secondary 1608 is connected to the heating coil 206 surrounding the bimetallic element 210. The functioning of this circuit, in many respects, is comparable to the functioning of the circuit disclosed in Fig. 2. Upon closing of switch 12, switch 14 is energized and motor 16 cranks the engine. After the engine is started, heater coil 206 causes the opening of contacts 45 and 46, which deenergizes switch 14. Functioning of the ignition system energizes ignition coil 24' which sets reed 1602 into oscillations synchronous with the cycle of the ignition system. Since the primary 1604 is connected in series with the reed and its contacts 1610 and 1612, vibration of the reed produces interrupted current in the primary 1604 and secondary 1608. The secondary is connected to the heater coil 206 and, therefore, as long as the engine is running the bimetallic element 210 will remain at a temperature keeping contacts 45 and 46 open. A condenser 1616 is connected across contacts 1610 and 1612 to prolong the life of these contacts. The natural period of reed 1602 should be higher than the highest obtainable period or cycle in the ignition system, which obviously is determined by the maximum speed for which the engine is normally designed. By removing the period of the reed sufficiently far from the maximum period of the ignition system, the reed is made to follow the magnetic cycle of core 1600 quite faithfully. Contacts 1610 and 1612 normally are in open position. Therefore, when ignition switch 12 is closed, and the engine is not running, no current flows through the primary 1604. It is to be noted that primary winding 1604 is not included in the ignition circuit and, therefore, it does not alter the impedances of the primary and secondary ignition circuits. The presence of reed 1602 obviously requires no alterations in the circuit elements of the ignition system.

Fig. 17 is a schematic disclosure of a bimetallic relay 8 which will respond to prevent useless and prolonged periods of engine rotation by the starting motor when the engine fails to start bcause of faulty parts, improper adjustment, or lack of fuel. Faulty parts, improper adjustment, or a flooded carburetor will very often cause an engine to make a series of false starts before it finally becomes self-operative, and frequently, the battery becomes exhausted before the engine is finally running. Regardless of the cause for the failure of the engine to operate successfully, relay 8 will respond to such failure by opening the circuit to switch coil 50, and thereby save further drain on the battery. A bimetallic element 1700 has one end fixed to block 1702, while the movable end is provided with a latch 1701 to hold a spring switch member 1704, in the position shown, to provide an electrical connection between switch member 1704 and one end of heater coil 1703. The other end of heater coil 1703 is connected to coil 50 of magnetic switch 14. Thus, in effect, heater coil 1703 is placed in a circuit in series with coil 50.

A prolonged flow of current through heater coil 1703 will heat bimetallic element 1700 causing the free end to bend upward allowing the latch 1701 to release the spring switch member 1704 and thereby break the electrical connection between member 1704 and heater coil 1703. Once the connection is broken, bimetallic element 1700 cools and assumes its normal position; however, no electrical connection is made until plunger 1706 which when manually operated, resets switch member 1704 behind latch 1701. A visual signal consisting of a lamp 1708 may be connected to blocks 1702 and 1705, so that, when the electrical connection between latch 1701 and switch member 1704 is broken the lamp 1708 remains in the circuit with coil 50 of switch 14. However, the high resistance of the lamp allows such a small amount of current to pass through coil 50 that the switch 14 returns to its normal position, i. e., bar 17 separates from contacts 13 and 15.

Fig. 18 discloses a restarting system which combines some of the features illustrated in Fig. 1, with other features illustrated in Fig. 16. When ignition switch 12 is closed, current flows from battery 10 through coil 50, of starting switch 14, into terminal block 37, thence along bimetallic element 43 across normally closed contacts 45 and 46 back to battery 10 by way of bimetallic element 36, terminal block 44 and common ground connections. This flow of current energizes starting switch 14 to bridge contacts 13 and 15 by contactor 17 and to thereby connect starting motor 16 with battery 10 whereupon cranking of the engine begins.

Wound around but insulated from bimetallic element 36 is a heater coil 40, one end of which is connected thereto by the shank of contact 46. When current flows into starting motor 16, current also flows through conductor 52 into heater coil 40 and back to battery 10 by way of bimetallic element 36, terminal block 44, and common ground connections. During engine cranking by the starting motor 6, the current passing into heater coil 40 being limited by the lowered battery voltage is insufficient to heat bimetallic element 36 to the degree for opening contacts 46 and 45. However, when the engine starts, starting motor 16 spins freely causing the battery voltage to return near to its normal open circuit value which value is sufficient to supply adequate current to heat coil 40 which heats element 36 to cause contacts 46 and 45 to separate and open the circuit of coil 50. Thus, the starting motor is disconnected from the battery.

If the engine dies, bimetallic element 36 cools, and contacts 46 and 45 close to reestablish the circuit for restarting the engine. However, if the engine rotates under its own power, contacts 46 and 45 are held open by heat supplied to bimetallic element 36 by means of a second heater coil 35 wound around but insulated from element 36. One end of heater coil 35 is connected to ground by means of the shank of contact 46, bimetallic element 36, and terminal block 44. The other end of coil 35 is connected to a reed 1800 mounted on a terminal 1802.

Rotation of the engine causes cam 30 to open and close contacts 27 and 28 for interrupting the flow of current through primary winding 20' of ignition coil 24'. Thus, the magnetic core 1804 is rapidly magnetized and demagnetized causing reed 1800 to vibrate and intermittently close the normally open contacts 1806 and 1808. Since contact 1808 is connected to conductor 48, current from the battery flows through heater coil 35 when contacts 1806 and 1808 are momentarily closed. Therefore, when the engine rotates under its own power contacts 1806 and 1808 operate to supply sufficient current to heater coil 35 for heating bimetallic element 36 to maintain contacts 46 and 45 open as long as the engine is running. If the engine should cease to rotate for any reason whatsoever, contacts 1806 and 1808 assume their normally open position and prevent the further flow of current through heater coil 35. Thus, bimetallic element cools with sufficient time lag to allow the engine to come to rest before contacts 46 and 45 close to reestablish the starting circuit for restarting the engine.

Bimetallic element 43, in addition to supporting contact 45, acts to compensate for variations in ambient temperatures. Safety relay 1201, described in connection with Fig. 12, may be installed in the circuit embracing coil 50 of magnetic switch relay 14. If desired, relay 6, described in connection with Fig. 9, may be installed in conductor 52.

Fig. 19 discloses a modification of the restarting system shown in Fig. 18. Instead of vibrating under the influence of the magnetic core of the ignition coil 24, reed 1800 vibrates in response to the magnetism induced in core 1900 by coil 1902. Coil 1902 is connected in the circuit between ignition switch 12 and primary winding 20 of ignition coil 24; therefore, when contacts 28 and 27 open and close to interrupt the flow of current in primary winding 20, the flow of current is also interrupted in coil 1902. Thus, core 1900 is alternately magnetized and demagnetized to vibrate reed 1800 for intermittently closing normally open contacts 1806 and 1808 to supply current to heater coil 35.

All other circuits in Fig. 19 are exactly the same as the circuits in Fig. 18 and operate in exactly the same manner.

In the event engine rotation ceases and comes to rest with contacts 27 and 28 in a closed position contacts 1806 and 1808 remain in an open position. A capacitor 1904 may be connected across coil 1902 if necessary.

Fig. 20 discloses a restarting system in which the charging and discharging of condenser 2000 is used to hold the starting motor circuit open while the engine is operating under its own power.

Closing ignition switch 12 causes current from battery 10 to flow through coil 50 of starting switch 2002 into terminal block 37 through bimetallic element 43, contacts 45 and 46, bimetallic element 36, and back to battery 10 by way of terminal block 44 and common ground connections. Thus, plunger 2004 causes contactor 17 to bridge contacts 13 and 15 thereby connecting the starting motor 16 to battery 10. Movement of plunger 2004 also allows contact arm 2006 to close contacts 2008 and 2010. In this manner contacts 2008 and 2010, and conductor 52 provide the means whereby current from battery 10 also flows through heater coil 2001 while current is flowing through starting motor 16. It is to be noted that one end of heater coil 2001 is connected to the terminal block 2005 upon which the contact arm 2006 is mounted, while the other end of heater coil 2001 is fastened to bimetallic element 36 by means of the shank of contact 46, thereby connecting the end of coil 2001 to ground through terminal block 44.

As long as the starting motor 16 is connected to battery 10, heater coil 2001 and bimetallic element 36 function in the same manner as coil 40 and bimetallic element 36 described in Figs. 1 and 18. Therefore, when the engine starts and the starting motor has disengaged the engine, contacts 46 and 45 open and interrupt the flow of current through coil 50. In this manner, plunger 2004 is allowed to assume its normal position which opens the circuit between the battery 10 and starting motor 16, and simultaneously moves contact arm 2006 so that contacts 2008 and 2010 are separated to open the circuit between heater coil 2001 and conductor 52.

If the engine dies, bimetallic element 36 cools permitting contacts 46 and 45 to close, whereupon the starting cycle is reestablished. However, if the engine starts successfully, contact 2012 alternately connects condenser 2000 to battery 10 and ground. Thus, condenser 2000 is charged and discharged through heater element 2001 and thereby provides the current for indirectly heating bimetallic element 36 so as to retain contacts 46 and 45 in their separated relationship previously accomplished by current supplied from the starting motor circuit.

Contact arm 2014 fixed to breaker arm 26 but insulated therefrom by insulator 2020 moves as a unit with breaker arm 26 in response to engine driven cam 30. Arm 2014 is connected to one side of condenser 2000 while the other side of the condenser 2000 is connected to heater element 2001.

Since movement of breaker arm 26 by engine driven cam 30 causes movement of arm 2014, contacts 2012 alternately engage contact 2016 which is connected to ground and contact 2018 which is connected to conductor 48 and battery 10. Therefore, when contacts 2012 and 2018 are closed condenser 2000 is charged through a circuit comprised of battery 10 ignition switch 12, conductor 48, contacts 2018 and 2012, contact arm 2014, condenser 2000, heater coil 2001, bimetallic element 36, terminal block 44, and common ground connections. Thus, to charge condenser 2000, current must pass through heater coil 2001. When contacts 2012 and 2016 are closed condenser 2000 is discharged through a circuit comprised of a ground connection, terminal block 44, bimetallic element 36, heater coil 2001, condenser 2000, contact arm 2014, contacts 2012 and 2016, and a second ground connection. Thus, to discharge condenser 2000, current must pass through heater coil 2001. Therefore, electrical energy passing into and out of condenser 2000 is used to heat coil 2001, and thereby indirectly heat bimetallic element 36. All elements of the ignition circuit operate in the conventional manner.

A safety relay 1201, described in connection with Fig. 12, may be installed in the circuit between ignition switch 12 and coil 50 of starting switch 2002. A second relay 6, described in connection with Fig. 9 may be inserted in conductor 52.

Fig. 21, a modification of the restarting system shown in Fig. 3, discloses heater coil 302, and condenser 300 connected in parallel with primary winding 20 of ignition coil 24; while condenser 312 is shown in dotted lines as a possible addition to the ignition circuit to limit arcing between contacts 27 and 28. Another difference between Fig. 21 and Fig. 3 is the arrangement of heater coil 302 and heater coil 316 around a single bimetallic element 306, and the addition of bimetallic element 43 for ambient temperature compensation.

The operation of the system is similar in many respects to the operation of previously described systems. Closing ignition switch 12 operates starting switch 14 which connects the battery 10 to starting motor 16; whereupon engine cranking begins. From the ignition switch 12, current flows through coil 20 and contacts 27 and 28. Engine driven cam 30, acting on breaker arm 26, periodically interrupts this flow of current through the coil 20 by opening contacts 27 and 28, setting up a cyclic transfer of energy from coil 20 to condenser 300 through heater coil 302 and back and forth many times whereby high voltages are generated in the secondary winding 31 for spark plugs 33. In Fig. 3, heater coil 302 is connected only in series with the oscillatory circuit, while in Fig. 21 it is in series with the oscillatory circuit and in parallel with the primary 20, which means that current from battery 10 flows through heater coil 302 as well as coil 20 when contacts 27 and 28 are closed. Thus heater coil 302 receives energy from the battery when contacts 27 and 28 are closed, and energy from the oscillatory circuit when contacts 27 and 28 are open.

Heater coil 316 connected to conductor 42 is in parallel with starting motor 16, and therefore it receives energy from the battery simultaneously with the starting motor. However, during cranking, the relatively slow rotation of the starting motor armature, the concomitant low resistance through the motor causes a considerable drop in battery voltage. When the engine starts, and the motor is disconnected from its load, the armature increases its speed and its counterelectromotive force, which permits the voltage of the battery to return to near normal voltage. Therefore, during cranking, low current flows through heater coil 316, which current increases as soon as the engine starts. This increase in current is sufficient to heat bimetallic element 306 to separate contacts 46 and 45 which opens the circuit to coil 50, and thus the magnetic switch 14 opens to interrupt the flow of current from the battery to starting motor 16.

If the engine dies, the calorific inertia delays the closure of contacts 45 and 46 until the starting motor comes to rest; and when they close, the restarting cycle begins again. If the engine runs, heater coil 302 supplies sufficient heat to hold contacts 45 and 46 open as explained above. If desired, relay 1201, described in connection with Fig. 12, may be included in conductor 38 leading to magnetic switch coil 50. Also, relay 6, described in connection with Fig. 9, may be included in conductor 52.

Fig. 22, a modification of the restarting system shown in Fig. 4, discloses a thermal relay comprising bimetallic elements 401 and 404 mounted on stationary terminal blocks 37 and 44 respectively. Contacts 417 and 418 normally in contact with each other are fixed to the free end of their respective bimetallic element. And electromagnetic relay 2200, having a winding 2201 connected to conductor 42, and a second winding 2202 connected to an engine driven generator 400, closes and opens a pair of contacts 2203 and 2204 which are in series with armature 2205, heater coil 402 and another pair of contacts 407 and 408. Contact 407 is connected so as to receive current from battery 10 through conductor 48 when ignition switch 12 is closed. Contact 408 is mounted on a contact arm 409, which has one end fixed to terminal block 410 while the other end, disposed beneath and in close proximity to the free end of bimetallic element 404, is provided with an insulating block 430, the function of which will be described later.

The operation of the system is quite similar to the operation of the systems previously described. Closing ignition switch 12 energizes starting motor 16, and simultaneously energizes winding 2201. Relay armature 2205 is adjusted so as not to open contacts 2208, 2207 and close contacts 2203, 2204 under the influence of the battery voltage while the starting motor 16 is cranking the engine. However, when the engine starts and the battery voltage returns to near its normal open circuit value in the manner previously described, the armature 2205 moves toward core 2206, and contacts 2208, 2207 are opened and contacts 2203, 2204 are closed. In this manner, the ground circuit to coil 50 is opened and heater coil 402 is connected to the battery through contacts 407, 408, contact arm 409, and terminal block 410. Heater coil 402, which is wound around bimetallic element 404 causes it to bend and separate contacts 417, 418. Thus the flow of current to coil 50 is interrupted causing the starter switch 14 to open the circuit between the battery 10 and conductor 42, thereby interrupting the flow of current into starting motor 16 and winding 2201. De-energizing relay winding 2201 will permit contacts 2203 and 2204 to assume their normal open position, and to thus interrupt the flow of current through heater coil 402. However, if the engine operates under its own power contacts 2203 and 2204 are held closed by the action of coil 2202 and the current said coil receives from the generator 400.

If the engine dies, instead of running under its own power, contacts 2207, 2208 close, contacts 2203, 2204 remain open, and contacts 418 and 417 close after a short time delay effected by the calorific inertia of bimetallic element 404. The closing of contacts 418 and 417 reconnects the starting motor circuit to re-crank the engine. Winding 2202 is proportioned to attract armature 2205 when energized by minimum voltages developed by the engine driven generator. Momentary cessation of generator voltage caused by engine loping may allow contacts 2203, 2204 to open and contacts 2208, 2207 to close for a short period of time, but, the starting motor will not be energized because of the calorific inertia of bimetallic element 404. In other words, before contacts 417 and 418 can close, the generator has opened contacts 2208, 2207 and reclosed contacts 2203, 2204 so that current will again flow through heater coil 402 to keep contacts 417 and 418 separated.

Contacts 407 and 408 are included in the heater coil circuit to control the maximum separation of contacts 417 and 418. In actual construction provision is made for ambient temperature compensation of the contacts 407 and 408 to insure uniform movement of the end of bimetallic element 404 in its downward travel to engage insulating block 430.

By adjusting the proximity of block 430 to the free end of bimetallic element 404 the temperature differential between the opening and closing of contacts 417 and 418 can be kept at any predetermined amount. In this manner, the amount of heat in calories that must be gained or lost by element 404 can be held within close limits. Since the gain and loss of heat requires time, then it can be said that contacts 407 and 408 control the time required for contact 418 to move from its maximum opened position to its closed position with contact 417.

Relay 2200 is in effect a combination of coil 422, Fig. 4, and coil 926 Fig. 9, plus the addition of contacts 2208 and 2207, which are opened simultaneously with the closing of contacts 2203 and 2204. Thus, instead of a direct ground connection 2210, shown in dotted lines, coil 50 is grounded through conductor 2209, stationary contact 2207, and movable contact 2208 mounted on the end of grounded armature 2205. By this alternate circuit for grounding coil 50, movement of armature 2205 so as to close contacts 2203 and 2204 also opens contacts 2207 and 2208. As above described, closure of contacts 2203 and 2204 connects heater coil 402 in circuit with battery 10, and the heat developed therein causes bimetallic element 404 to open contacts 417 and 418. When the engine starts, voltage from the generator energizes coil 2202, and contacts 2203 and 2204 are held closed to maintain a ground connection for heater coil 402. If the engine dies, armature 2205 returns to its normal position, and contacts 2207 and 2208 are closed, and contacts 2203 and 2204 are opened. In this manner, heater coil 402 is disconnected from its ground connection, and coil 50 is reconnected to its ground connection. However, this shift in circuit connections does not reestablish the circuit between coil 50 and the battery until after the heat imparted to bimetallic element 404 by heater coil 402 has been dissipated sufficiently to allow contacts 417 and 418 to close. Thus, by calorific inertia, a time delay has been provided to allow both the starting motor and the engine to come to rest.

By including ground 2210 as part of the circuit embracing coil 50 and removing contacts 2207, 2208 and conductor 2209, contacts 2203, 2204 operate in a manner similar to contacts 928 and 930, while coils 2201 and 2202 actuate armature 2205. An advantage of the system in Fig. 22, is the opening of the starting-motor circuit without any influence from the calorific inertia of bimetallic element 404 while permitting the use of that inertia to delay the closing of said circuit.

In the circuit embracing coil 50, relays 8 and 901 indicated by dotted circles may be included if desired.

Since, as previously described, the speed of rotation of a starting-motor armature varies inversely with the load; and since the speed of the armature determines the counterelectromotive force developed in the motor; and since counterelectromotive force is an effective resistance in an electrical circuit; it follows that the armature with its varying speed effectively changes the apparent resistance of the motor.

A performance chart of a conventional starting motor for an internal combustion engine is shown in Fig. 25, in which dotted line 2500 indicates the stalled condition of the motor, or a condition of locked torque with no rotation of the armature. Under this condition the actual resistance of the starting motor is .005 ohm. At line 2501, armature speed is 950 R. P. M., the current is 300 amperes, and the voltage is 4.5 volts, thus a total resistance of .015 ohm exists within the motor. Two thirds of this resistance or .01 ohm results from counterelectromotive force. At line 2502, armature speed is 3000 R. P. M., the current is 100 amperes, the voltage 5.5 volts; therefore, the resistance is .055 ohm or more than ten times the resistance at zero armature speed.

From this description of the phenomena which result from the operation of a starting motor, it becomes apparent, that by adding a circuit element or elements to the two circuit elements comprising the starting motor; namely, the armature and the fields, a variety of circuit combinations can be produced. Each combination of circuit elements forms a network which will behave in accordance with well established circuit laws.

In the restarting systems described in connection with Figs. 1 through 22, the starting motor armature and field coils have been collectively considered as a single circuit element, and a second circuit element in the form of a heater coil 40 in Fig. 1 or heater coil 602 in Fig. 6, for example, or relay coil 926 in Fig. 9 or relay coil 2201 in Fig. 22, as another example, has been added to form a circuit network to effectuate the opening of a starting-motor circuit. In network diagram 22a the relationship of those circuit elements just referred to are illustrated. The armature is indicated as a variable resistance R1 in series with field coils R2 to produce resistance R. R3 is connected in parallel to R, and therefore, any change in voltage in battery 10 will change the amount of current flowing through R3. R3 being the schematic representation of all circuit elements capable of producing the sought results in connection with the operation of the automatic restarting systems in Figs. 1 through 22.

In Fig. 23 an automatic restarting system considerably more sensitive to the counterelectromotive force developed by the starting-motor armature is illustrated, in which field coils 2301, and armature 2302, of starting motor 16, are considered as separate and distinct circuit elements. In this system heater coil 40, which is wound around bimetallic element 36, is connected by conductor 52 to junction 2303 between field coils 2301 and armature 2302. Therefore, when starting switch 14 closes the starting-motor circuit current in proportion to the current flowing in the other branches of the network flows through heater coil 40. This network just referred to is diagrammed in Fig. 23a. Starting-motor armature 2302 is indicated as a variable resistor R1 in series with field coil R2 (2301) and battery 10. R3 is representative of heater coil 40 which is connected in series with field coil R2 and in parallel with armature R1.

By connecting heater coil 40 to junction 2303, any change in apparent resistance of the armature R1 (2302) is instantly reflected in the amount of current passing through heater coil R3 (40). In Fig. 22a, the amount of current passing through R3 is dependent entirely upon the voltage of battery 10, and the voltage of battery 10 is dependent upon its internal resistance; therefore, the internal resistance of the battery actually controls the current passing through R3. This is not the case in Figs. 23 and 23a, since the circuit is divided at the junction between the field coils and the armature whereby changes in the apparent resistance of the armature as well as changes in the internal resistance of the battery are reflected in the amount of current passing through heater coil 40 (R3).

In addition to heater coil 40, a second heater coil 35 is wound around bimetallic element 36. Coil 35 is coupled to the ignition system as the diagonal circuit element of a Wheatstone bridge in which primary winding 20, of ignition coil 24, is one arm of the bridge, and resistors 2304, 2305 and 2306 form the other arms of the bridge. To limit the heating effect of heater coil 35, and thus to limit the amount of movement of bimetallic element 36, contacts 406 and 408 are connected in the circuit with coil 35.

Closing ignition switch 12 energizes the starting motor whereupon engine cranking begins. When the engine starts, starting motor 16 disengages the engine causing the armature to increase its rotational speed. This results in an increased flow of current through heater coil 40 which causes bimetallic element to open contacts 46 and 45 and deenergize the starting motor. If the engine continues to be self-operating heater coil 35 takes over the heating of bimetallic 36 to hold contacts 46 and 45 open.

The amount of current passing through primary winding 20 of ignition coil 24 is determined by the speed or frequency with which contacts 27 and 28 are opened and closed. At cranking speed the frequency is low, therefore more current passes through winding 20 than at idling speeds of the engine. In other words winding 20 and contacts 27 and 28 act as a variable resistor which varies resistance in proportion to the engine speed. By adding properly proportioned resistors 2304, 2305 and 2306 to the circuit connecting winding 20 to battery 10, a Wheatstone bridge can be formed. Connecting one side of heater coil 35 at the junction of winding 20 and resistor 2304, and the other side of heater coil 35 at the junction of resistors 2305 and 2306 very little current can be made to pass through heater coil 35 during cranking, which current will increase sufficiently to heat bimetallic element 36 when the engine is self-operating. In this manner contacts 46 and 45 can be held open while the engine is operating under its own power.

To limit the heating effect of coil 35, bimetallic element 36 opens contacts 407 and 408 when it touches insulator 430 mounted on the end of arm 409. Contact 407 is stationary, and contact 408 is fixed to arm 409 which is mounted on stationary block 410. Bimetallic element 43, mounted on block 37, carries contact 45 and acts to compensate for ambient temperatures. If it is desired, relays 901 and/or 8 described in connection with Figs. 9 and 17 respectively, may be included in the circuit of coil 50 as shown by dotted circles.

In Fig. 24, an automatic restarting system is illustrated in which the field coils 2301, and armature 2302, of starting motor 16, are considered as separate and distinct circuit elements forming two branches of a Wheatstone bridge type of network. Forming two other branches of the network, circuit elements 2401 and 2402 are connected in series with each other and in parallel with field coils 2301 and armature 2302 respectively; and a fifth circuit element comprised of heater coil 40, in block 2400, is connected at the junction 2403, of elements 2401 and 2402, and junction 2303, of armature 2302 and field coils 2301, to complete the network.

The above network is illustrated in diagram 24a in which the starting-motor armature 2302 is represented as a variable resistor R1, field coils 2301 are indicated as R2, heater coil 40 as R3, element 2401 as R5, and element 2402 as R4.

As previously explained, a starting-motor armature becomes an effective variable resistance element in which the resistance varies with its speed of rotation; therefore, at any particular speed, such as engine cranking speed, R1 has a particular value. If, at that particular value of R1, the values of R2, R4, and R5 are such that the ratio of R1:R2 equals the ratio of R4:R5; then no current will flow through R3 because there is no potential difference between the junctions connecting R3 in the network. Now, by increasing or decreasing the value of R1, but with no change in the values of R2, R4, and R5, current will flow in circuit element R3, because the ratio of R1:R2 will not be equal to the ratio of R4:R5, and a potential difference will exist between the junctions connecting R3 in the network.

In Fig. 24, the resistance of circuit elements 2402 and 2401 is proportioned with respect to the resistance of armature 2302 and field coils 2301 so that, at cranking speed of the armature, no current will flow through heater coil 40. Since any change in armature speed will change the counterelectromotive force and the apparent resistance of the armature 2302, it follows that such a change will effect the proportionality of resistance of the circuit elements and allow current to flow through heater coil 40.

The change in resistance of armature 2302, because of a reduction in its speed of rotation permits heater coil 40 to open the starting-motor circuit under a condition of locked torque or extreme overload, as well as a condition of no load which occurs after the engine has started. In other words, heater coil 40 and elements 2402 and 2401 are proportioned to meet both conditions of changed armature resistance.

Under normal operation, closing ignition switch 12 connects starting motor 16 to battery 10, and because of the balanced resistance relationship of circuit elements 2401 and 2402 with respect to field coils 2301 and armature 2302 no current flows through heater coil 40 until after the engine is started, at which time the unbalanced network allows current to flow and bimetallic element 36 is heated sufficiently to open contacts 45 and 46. In this manner, the current to coil 50 is interrupted and the starting motor 16 is disconnected from the battery 10. If the engine continues rotating under its own power, transformer 22, of Fig. 1, supplies the current for heater coil 35, which, like coil 40, is wound around bimetallic element 36, and provides the heat needed by element 36 to keep contacts 45 and 46 separated. If the engine dies, and after bimetallic element 36 has cooled sufficiently to allow contacts 45 and 46 to close the circuit embracing coil 50; then, starting switch 14 begins the restarting cycle by connecting starting motor 16 to battery 10. Although block 2400 shows a thermal relay similar to the relay shown and described in connection with Fig. 1, which relay contains a circuit element in the form of heater coil 40 connected by conductors 52 and 52' to junction points 2303 and 2403, block 2400 could, for example, contain a circuit element in the form of heater coil 1208, Fig. 12, or a circuit element in the form of coil 2201, Fig. 22, connected to junction points 2303 and 2403, Fig. 24, for the purpose of opening a starting-motor circuit at some predetermined condition of starting motor operation. In other words, the network shown in diagram 24a can be applied to any of the restarting systems shown in Figs. 1 through 23.

In describing Fig. 24, reference was made to the resistance of circuit elements 2402 and 2401 being proportioned with respect to armature 2302 and field coils 2301 so that no current flows through heater coil 40 at cranking speed of the armature. Now, by proportioning the resistance of elements 2402 and 2401 so that a small amount of current flows through heater coil 40 during engine cranking, bimetallic element 36 can be heated for opening contacts 45 and 46 to prevent prolonged and useless cranking when an engine fails to become self-operating. Therefore, by having the resistance of element 2402 and 2401 properly proportioned with respect to the resistance of the armature and the field coils, bimetallic element 36 can be made to open contacts 45 and 46 under conditions of locked torque, prolonged and useless cranking, and when the starting motor is rotating without any load. Relay 901 described in connection with Fig. 9 may be included in the circuit embracing coil 50 as indicated by a dotted circle.

Throughout the description of various figures illustrating this invention, the words "calorific inertia" are used to denote that property of a body by virtue of which it offers resistance to heat transfer; hence time is required for the absorption and/or emission of heat. As indicated in the opening paragraph of this description, the invention and modifications thereof herein described relate to the starting and restarting of engines requiring prerotation before they can become self-operating prime movers, therefore, it is understood that the words "internal combustion engine" are fully intended to include such engines.

What is claimed is:

1. An electrical starting system for an internal combustion engine, said system comprising: a battery; a starting motor for cranking said engine; a starting-motor circuit embracing said motor and said battery; and means coupled to said starting motor for opening and closing said starting-motor circuit, said means including an element having calorific inertia, and means responsive to a running function of the engine operatively coupled to said element for holding said starting-motor circuit open.

2. An electrical starting system for an internal combustion engine, said system comprising: a battery; a starting motor for cranking said engine; a starting-motor circuit embracing said starting motor and said battery; switch means for opening and closing said starting-motor circuit; and control means responsive to counterelectromotive force developed in said motor and to electromotive force of said battery to actuate said switch means, said control means including a heat responsive element having calorific inertia, and means responsive to a running function of the engine operatively coupled to said element for causing said switch means to hold said starting-motor circuit open.

3. An electrical system for an internal combustion engine, said system comprising: a battery; a starting motor for cranking said engine; a starting-motor circuit connecting said starting motor to said battery; a starting-motor circuit switch for opening and closing said starting-motor circuit; electroresponsive means for opening and closing said switch; a second circuit embracing said electroresponsive means and said battery; means coupled to said starting-motor circuit for opening and closing said second circuit, said means including a circuit element responsive to a change in counterelectromotive force developed in said starting motor and electromotive force of said battery, a thermoresponsive member associated with said circuit element, said member having calorific inertia, and means responsive to a running function of said engine and operatively coupled to said thermoresponsive member for holding said second circuit open.

4. An electrical starting system for an internal combustion engine, said system comprising: a battery; a starting motor for cranking said engine; a starting-motor circuit connecting said starting motor and said battery; a starting-motor circuit switch for opening and closing said starting-motor circuit; electroresponsive means for opening and closing said starting-motor switch; a control circuit embracing said electroresponsive means and said battery; switch means for opening and closing said control circuit; thermoresponsive means, having calorific inertia, for actuating said switch means to operate said electroresponsive means for opening and closing said starting-motor circuit switch; means coupled to said starting-motor circuit and responsive to a change in counterelectromotive force developed by said starting motor and electromotive force of said battery for heating said thermoresponsive means to open said switch means; said switch means utilizing said calorific inertia for holding said control circuit open; and means operatively coupled to said thermoresponsive means and responsive to self-operation of the engine for holding said control circuit open while said engine is operating under its own power.

5. An electrical starting system for an internal combustion engine, said system comprising: a battery; a starting motor for cranking said engine; a starting-motor circuit including a starting-motor switch for interconnecting said starting motor and said battery; electroresponsive means for opening and closing said starting-motor switch; a control circuit including a normally closed switch for interconnecting said electroresponsive means and said battery; thermoresponsive means, having calorific inertia, for opening and closing said normally closed switch for operating said electroresponsive means to open and close said starting-motor switch; means coupled to said starting-motor circuit and responsive to a change in counterelectromotive force developed in said motor and electromotive force of said battery for actuating said thermoresponsive means to open said normally closed switch after said engine has started; and means responsive to a running function of the engine operatively coupled to said thermoresponsive means for holding open said normally closed switch; said calorific inertia of said thermoresponsive means operating to delay reclosure of said normally closed switch for a predetermined length of time.

6. An electrical system for starting an internal combustion engine, said system comprising: a battery; an ignition system for said engine; a starting motor for cranking said engine; a starting-motor circuit including a starting-motor switch for connecting said starting motor and said battery; electroresponsive means for opening and closing said starting-motor switch; a control circuit including normally closed switch means for interconnecting said electroresponsive means and said battery; thermoresponsive means, having calorific inertia, for opening and closing said normally closed switch means for operating said electroresponsive means to open and close said starting-motor switch; first means coupled to said starting-motor circuit, and operated through a predetermined change in counterelectromotive force developed in said starting motor and by the electromotive force of said battery for heating said thermoresponsive means to open said normally closed switch means after said engine has started; and second means coupled to said ignition system and operatively associated with said thermoresponsive means for holding open said normally closed switch means while said engine is operating under its own power, said second means functioning in response to the self-operation of said engine; said calorific inertia of said thermoresponsive means operating to delay reclosure of said normally closed switch means after said first means and said second means have ceased their functions.

7. An electrical system for starting an internal combustion engine as defined in claim 6, in which the ignition system includes a primary circuit and said second means is inductively coupled in said primary circuit.

8. An electrical system for starting an internal combustion engine as defined in claim 6, in which the ignition system includes a primary circuit and said second means is magnetically coupled in said primary circuit.

9. An electrical system for starting an internal combustion engine as defined in claim 6, in which the ignition system includes a primary circuit, and said second means is coupled to said primary circuit by a Wheatstone bridge circuit.

10. An electrical system for an internal combustion engine, said system comprising: a battery; an engine-driven generator; a starting motor for cranking said engine; a starting-motor circuit including a starting-motor switch for connecting said starting motor and said battery; electroresponsive means for opening and closing said starting-motor switch; a control circuit including normally closed switch means for connecting said electroresponsive means and said battery; thermoresponsive means, having calorific inertia, to open and close said normally closed switch means for operating said electroresponsive means to open and close said starting-motor switch; operating means coupled to said starting-motor circuit, and operated through a predetermined change in counterelectromotive force developed in said starting motor, and by the voltage of said battery for heating said thermoresponsive means to open said normally closed switch means after said engine has started; and cooperating means coupled to said generator and associated with said operating means for holding open said normally closed switch means while said engine is operating uner its own power; said calorific inertia of said thermoresponsive means operating to delay reclosure of said normally closed switch means after said operating means and said cooperating means have ceased their functions.

11. An electrical system for an internal combustion engine, said system comprising: a battery; an engine-driven generator; a starting motor for cranking said engine; a starting-motor circuit including a starting-motor switch for connecting said starting motor and said battery; electroresponsive means for opening and closing said starting-motor switch; a control circuit embracing said electroresponsive means and said battery; thermoresponsive means included in said control circuit; a heater circuit for said thermoresponsive means including a heating element; a magnetic relay for simultaneously opening said control circuit and closing said heating circuit; a first coil for operating said relay, said coil being coupled to said starting motor circuit and responsive to a predetermined change in the counterelectromotive force developed in said starting motor, and the voltage of said battery after said engine has started; and a second coil coupled to said generator for operating said relay to hold said heater circuit closed while said engine is operating under its own power; said thermoresponsive means operating to close said control circuit a predetermined length of time after said first and second coils have ceased to function.

12. An automatic starting system for an internal combustion engine, said system comprising: a battery; an exhaust manifold for said engine; a starting motor for cranking said engine; a starting-motor circuit including a starting-motor switch for connecting said starting motor and said battery; electroresponsive means for opening and closing said starting-motor switch; a control circuit embracing said first electroresponsive means and said battery; thermoresponsive means, having calorific inertia, for opening and closing said control circuit; heating means coupled to said starting-motor circuit, said means being responsive to a predetermined change in the counterelectromotive force developed in said starting motor, and the voltage of said battery for actuating said thermoresponsive means to open said control circuit after said engine has started; and second thermoresponsive means, having calorific inertia, and associated with said control circuit for holding said circuit open in response to heating means within said exhaust manifold while said engine is self-operating; said calorific inertia of said first and said second thermoresponsive means operating to delay reclosure of said control circuit after said first and said second heating means have ceased to function.

13. An electrical starting system for an internal combustion engine, said system comprising: a battery; a starting motor for cranking said engine; a starting-motor circuit connecting said starting motor to said battery; a starting-motor switch for opening and closing said starting-motor circuit; electroresponsive means for operating said starting-motor switch; a second circuit embracing said electroresponsive means and said battery; means for opening and closing said second circuit, said means including heat-responsive means having calorific inertia; a circuit element coupled to said starting-motor circuit and responsive to a predetermined change in counterelectromotive force developed in said starting motor and electromotive force of said battery for actuating said heat-responsive means to open said second circuit after said engine has started; means associated with said heat-responsive means and responsive to self-operation of said engine for holding open said second circuit while said engine is operating under its own power; and means associated with said second circuit to prevent unintentional operation of the starting system.

14. In an automatic starting device for internal combustion engines; a starting motor containing field coils and an armature connected in series with said field coils; a starting circuit including said field coils, said armature, and a magnetic starting switch; a control circuit for said starting switch including a self-closing switch; and a circuit element associated with said self-closing switch, said circuit element being coupled to said starting circuit in series with said field coils and in parallel with said armature, and being operative to open said self-closing switch.

15. In an automatic starting device for internal combustion engines; a starting motor containing an armature and field coils in series with said armature; a starting circuit including said armature, said field coils and a starting switch; a control circuit for said starting switch including a self-closing switch; and actuating means associated with said self-closing switch, said actuating means including a circuit coupled to said starting circuit in series with said field coils and in parallel with said armature, said actuating means being operative to open said self-closing switch.

16. In an automatic starting device for internal combustion engines; a starting motor containing an armature and field coils in series with said armature; a starting circuit including said armature, said field coils and an electromagnetic switch; a control circuit for said starting switch including a normally closed switch; means for opening said normally closed switch, said means including a circuit connected in series with said field coils and in parallel with said armature; and means responsive to self-operation of the engine to prevent closure of said normally closed switch.

17. In an automatic starting device for internal combustion engines; a starting motor containing an armature and field coils joined in series with said armature; a starting circuit including said armature, said field coils and an electromagnetic starting switch, a control circuit for said starting switch including a normally closed switch; and a Wheatstone bridge circuit coupled to said starting circuit and operative to open said normally closed switch, said bridge circuit comprising a first resistor and a second resistor joined in series with each other and connected in parallel with said armature and said field coils, and a circuit element connected to the junction of said resistors and the junction of said armature and said field coils.

18. In an automatic starter for internal combustion engines; a source of electrical energy; an electric motor adapted for cranking an engine, said motor containing an armature and field coils joined in series with said armature; a motor circuit supplying energy from said source to said motor; electroresponsive means for opening and closing said motor circuit to deenergize and energize said starting motor; and a Wheatstone bridge circuit coupled to said electroresponsive means and coupled to said motor circuit, said bridge circuit including means responsive to predetermined changes in counterelectromotive force developed by said armature while energy is supplied from said source to said motor, said means being operative to cause the opening of said motor circuit.

19. In an automatic starter for internal combustion engines; a source of electrical energy; an electric motor adapted for cranking an engine, said motor containing an armature and field coils joined in series with said armature; a motor circuit including a motor switch, said circuit supplying energy from said source to said armature and said field coils; electroresponsive means for operating said motor switch; a control circuit embracing a normally closed switch and said electroresponsive means; a Wheatstone bridge circuit coupled to said motor circuit, said bridge circuit comprising a first resistor and a second resistor joined in series with each other and connected in parallel with said armature and said field coils, and means coupled to the junction of said resistors and the junction of said armature and said field coils, said means being responsive to predetermined changes in counterelectromotive force developed by said armature while energy is supplied from said source to said armature, said means being operative to open said normally closed switch for disconnecting said motor from said source of energy; and means responsive to self-operation of an engine for holding said motor disconnected from said source of energy while the engine is operating under its own power.

20. In an automatic starting system for an internal combustion engine including a battery, a starting motor adapted for cranking the engine, and a switch for connecting the starting motor to the battery, the combination of bimetallic means for opening the switch in response to a predetermined change in counterelectromotive force developed in the starting motor when the motor is connected to the battery, means associated with said bimetallic means and responsive to self-operation of the engine for holding the switch open while the engine is running under its own power, means for closing the switch a predetermined length of time after the engine stalls, and bimetallic means for cooperation with the first named bimetallic means to compensate for changes in ambient temperature.

21. A combination as defined in claim 20 which also includes an automatic lockout means for opening the switch and disconnecting the motor from the battery after prolonged and unsuccessful cranking of the engine by the starting motor.

22. A combination as defined in claim 21 in which said automatic lockout means includes a visual signal means indicating the operation of said automatic lockout means, and a manually operable push-button for resetting said means.

23. In an automatic starting system for an internal combustion engine, which system includes a starting circuit embracing a battery, a starting motor for cranking the engine, a starting switch for opening and closing the starting circuit, and an ignition system for the engine; the combination of a thermal switch of the gaseous electric discharge type for controlling the operation of the starting switch, said thermal switch comprising a sealed envelope containing an ionizable gaseous atmosphere; normally closed contacts; thermoresponsive means for opening and closing said contacts; a heating element for actuating said thermoresponsive means to open said normally closed contacts, said heating element being responsive to predetermined change in the counterelectromotive force developed in the starting motor and the battery voltage when the starting circuit is closed by the starting switch; and means for holding open said normally closed contacts, said means comprising an electrode spaced from said thermoresponsive means and responsive to electrical energy flowing in the ignition system for establishing a glow discharge to heat said thermoresponsive means while the engine is self-operating.

24. In an automatic starting device for an internal combustion engine having a starting circuit and an ignition circuit, the combination of means responsive to the intermittent flow of electrical energy in the ignition circuit for holding open the starting circuit while the engine is operating under its own power, said means including a pair of normally open contacts, a vibrative armature for closing said contacts intermittently in response to the intermittent flow of electrical energy in the ignition circuit.

25. The combination defined in claim 23 in which said last named means includes limiter means for limiting the contact-opening movement of said thermoresponsive means resulting from said glow discharge.

26. In an electrical system for an internal combustion engine, said system including a battery, a starting motor for cranking the engine, a starting motor circuit, an electromagnetic switch for opening and closing the starting motor circuit, and an ignition system having a primary circuit; a thermal switch of the gaseous electric discharge type for controlling the operation of the electromagnetic switch, said thermal switch comprising: a sealed envelope containing an ionizable gaseous atmosphere, a pair of normally closed contacts, thermoresponsive means for opening said normally closed contacts, and an electrode spaced from said thermoresponsive means and inductively coupled to the primary circuit of the ignition system for establishing a glow discharge to heat said thermoresponsive means for actuating said normally closed contacts while the engine is operating under its own power.

27. In an electrical system for an internal combustion engine, said system including a battery, a starting motor for cranking the engine, a starting motor circuit, an electromagnetic switch for opening and closing the starting motor circuit, and an ignition system; a thermal switch of the gaseous electric discharge type for controlling the operation of the electromagnetic switch, said thermal switch comprising: a sealed envelope containing an ionizable gaseous atmosphere, a pair of normally closed contacts, thermoresponsive means for opening said normally closed contacts, and an electrode spaced from said thermoresponsive means and inductively coupled to the ignition system for establishing a glow discharge to heat said thermoresponsive means while the engine is operating under its own power, said electrode cooperating with said thermoresponsive means for limiting the opening between said contacts.

28. In an electrical system for an internal combustion engine, said system including a battery, a starting motor for cranking the engine, a starting motor circuit, and an electromagnetic switch for opening and closing the starting circuit, a thermal switch for controlling the operation of the electromagnetic switch, said thermal switch comprising: normally closed contacts; thermoresponsive means having calorific inertia for opening said normally closed contacts; first means coupled to the starting motor and responsive to current flowing in the starting motor circuit for heating said thermoresponsive means for opening said normally closed contacts; and second means for heating said thermoresponsive means for holding said normally closed contacts open in response to a running function of the engine while the engine is operating under its own power, and limiting means actuated by said thermoresponsive means for limiting the heating effect of said second means.

29. In an electrical starting system for an internal combustion engine; a battery; a starting motor for cranking said engine; a starting-motor switch, having an actuating coil, for connecting said motor to said battery; a first circuit connecting the coil of said starting-motor switch in series with said battery; a control switch, having closed and open positions, connected in said first circuit for normally controlling the actuation of said starting-motor switch, said control switch being in closed position while said starting motor is cranking the engine and in open position while the engine is self-operating; a safety switch having a pair of normally-open contacts connected in said first circuit; selectively-operable means adapted to close the normally-open contacts of said safety switch and permit said control switch to be effective for closing and opening said first circuit for controlling the actuation of said starting-motor switch; and holding means for holding closed the normally-open contacts of said safety switch when said contacts are closed by said selectively-operable means.

30. The combination defined in claim 29 which also includes an ignition switch, having closed and open positions, for energizing and deenergizing the ignition system of the engine, and for connecting one side of said first circuit to one terminal of said battery when said ignition switch is in closed position, and for disconnecting said one side of said first circuit from said one terminal of said battery when said ignition switch is in open position; and in which said holding means comprises an electromagnet having a coil connected to said battery through said ignition switch for holding closed the contacts of said safety switch when said ignition switch is in closed positon; said electromagnet operating to release said contacts and permit their return to normal open position when said ignition switch is moved to open position.

31. The combination defined in claim 30 which also includes a resistor connected in series with said battery and the coil of said electromagnet; and in which said selectively-operable means comprises a manually-operable normally-open shunt switch connected to the coil of said electromagnet in parallel with said resistor for permitting current of optimum value to flow through said coil when said shunt switch is closed.

32. The combination defined in claim 30, in which said electromagnet includes an armature having a normal first position, said armature being manually movable from said first position to a second position for closing the normally-open contacts of said safety switch; and in which said manually-movable armature comprises said selectively-operable means, whereby the normally-open contacts of said safety switch are closed to permit said control switch to be effective for closing and opening said first circuit for controlling the actuation of said starting-motor switch.

References Cited in the file of this patent

UNITED STATES PATENTS

| | | | |
|---|---|---|---|
| 1,484,539 | Williams et al. | Feb. 19, | 1924 |
| 1,507,300 | Replogle | Sept. 2, | 1924 |
| 1,607,497 | Williams et al. | Nov. 16, | 1926 |
| 1,738,540 | Replogle et al. | Dec. 10, | 1929 |
| 1,773,913 | Loehr et al. | Aug. 26, | 1930 |
| 1,903,761 | Guettner, Jr. | Apr. 18, | 1933 |
| 1,912,904 | Loehr et al. | June 6, | 1933 |
| 1,917,565 | Williams | July 11, | 1933 |
| 1,983,787 | Bertsche, Jr. | Dec. 11, | 1934 |
| 2,003,638 | Nothstine | June 4, | 1935 |
| 2,004,053 | Loehr et al. | June 4, | 1935 |
| 2,009,036 | Whitney | July 23, | 1935 |
| 2,016,818 | Maurer | Oct. 8, | 1935 |
| 2,020,749 | Watson | Nov. 12, | 1935 |
| 2,020,750 | Wertz | Nov. 12, | 1935 |
| 2,021,396 | Williams | Nov. 19, | 1935 |
| 2,064,350 | Maurer | Dec. 15, | 1936 |
| 2,121,974 | Loehr et al. | June 28, | 1938 |
| 2,131,403 | Loehr et al. | Sept. 27, | 1938 |
| 2,135,620 | Loehr et al. | Nov. 8, | 1938 |
| 2,165,133 | Cuthbertson | July 4, | 1939 |
| 2,174,101 | Williams | Sept. 26, | 1939 |
| 2,197,726 | Johnson | Apr. 16, | 1940 |
| 2,329,134 | Peters | Sept. 7, | 1943 |
| 2,371,018 | Ashworth et al. | Mar. 6, | 1945 |
| 2,485,520 | Warsher | Oct. 18, | 1949 |